United States Patent
Kaida

(10) Patent No.: US 7,599,683 B2
(45) Date of Patent: Oct. 6, 2009

(54) SPEECH COMMUNICATION SYSTEM AND TALKER RIGHT RESERVATION METHOD

(75) Inventor: Sou Kaida, Tokyo (JP)

(73) Assignee: NEC Corporation, Tokyo (JP)

( * ) Notice: Subject to any disclaimer, the term of this patent is extended or adjusted under 35 U.S.C. 154(b) by 369 days.

(21) Appl. No.: 11/304,915

(22) Filed: Dec. 16, 2005

(65) Prior Publication Data

US 2006/0171528 A1    Aug. 3, 2006

(30) Foreign Application Priority Data

Dec. 22, 2004    (JP) .............................. 2004-370320

(51) Int. Cl.
 *H04M 3/00* (2006.01)
(52) U.S. Cl. .................. 455/416; 379/202.01
(58) Field of Classification Search ............ 379/202.01; 370/260; 455/416

See application file for complete search history.

(56) References Cited

U.S. PATENT DOCUMENTS

| 5,537,684 | A | 7/1996 | Cassidy et al. |
| 5,859,663 | A | 1/1999 | Simon |
| 7,085,244 | B2 * | 8/2006 | Koskelainen et al. ........ 370/261 |
| 2002/0102999 | A1 | 8/2002 | Maggenti et al. |

FOREIGN PATENT DOCUMENTS

| JP | 2003-526275 A | 9/2003 |
| WO | WO 01/67674 A2 | 9/2001 |
| WO | WO 03/036801 A2 | 5/2003 |

OTHER PUBLICATIONS

OMA Open Mobile Alliance: "Push to talk over Cellular (PoC)—Architecture Draft Version 1.0 Open Mobile Alliance OMA-AD_V1_0-20041117-D," [Online] Nov. 17, 2004, pp. 10152 (XP002372965).

* cited by examiner

*Primary Examiner*—Alexander Jamal
(74) *Attorney, Agent, or Firm*—Foley & Lardner LLP

(57) ABSTRACT

A speech communication system includes a plurality of portable terminals and a server device. The server device manages the talker right specifying a terminal which transmits speech when speech communication is performed between the portable terminals. The portable terminal includes a registration request notification unit. The registration request notification unit transmits, to the server device in response to predetermined external operation, a registration request notification for requesting registration of a reservation for the talker right. The server device includes a management table and a reservation registration unit. The management table stores management information containing the reservation status of the talker right. The reservation registration unit registers a reservation for the talker right in the management table in accordance with a registration request notification from the portable terminal. A talker right reservation method is also disclosed.

47 Claims, 19 Drawing Sheets

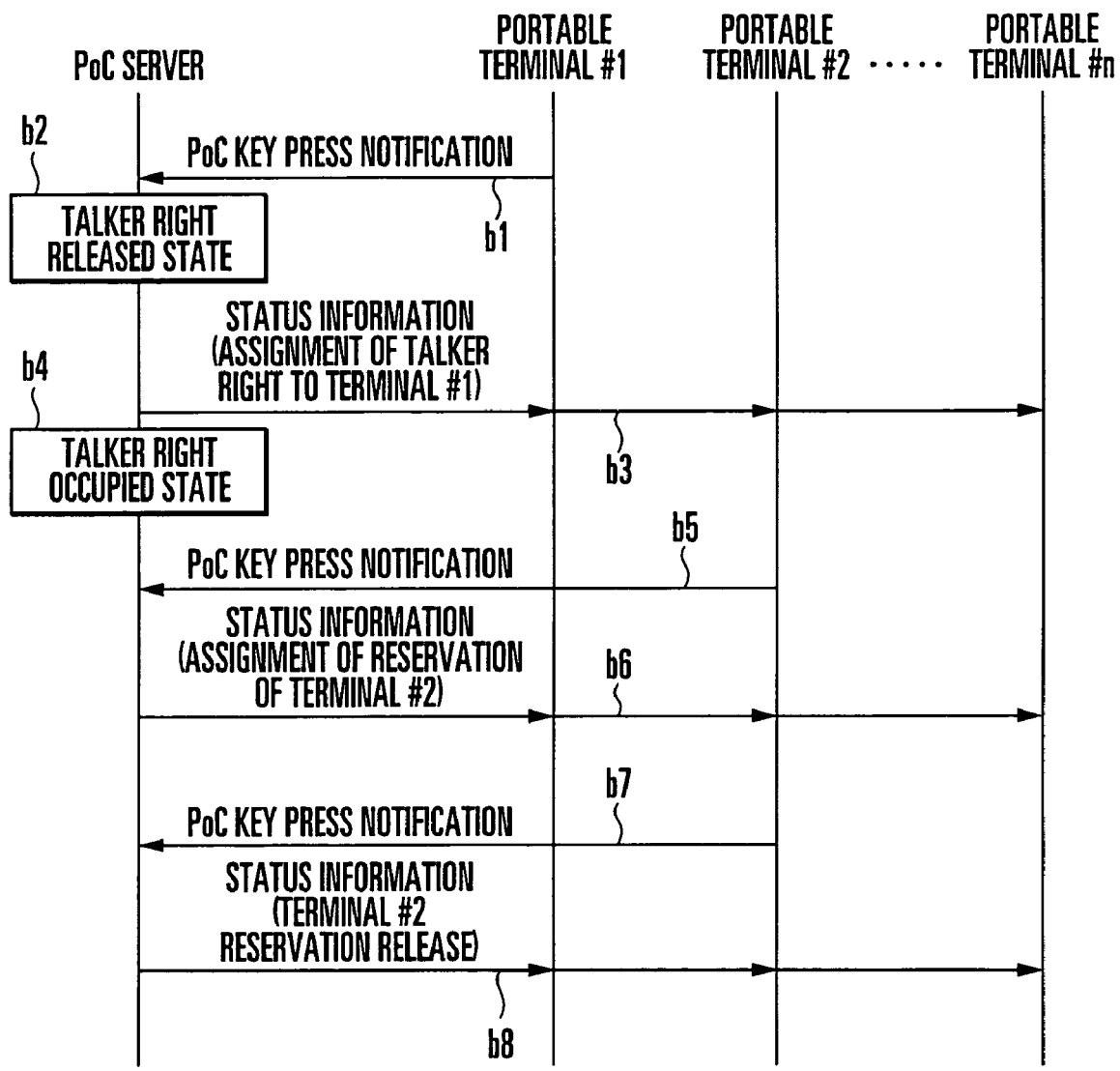
F I G. 3

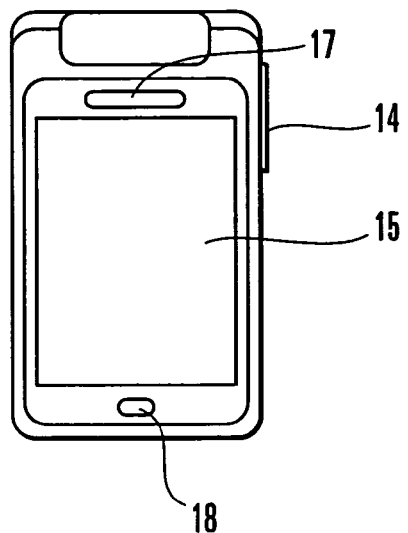
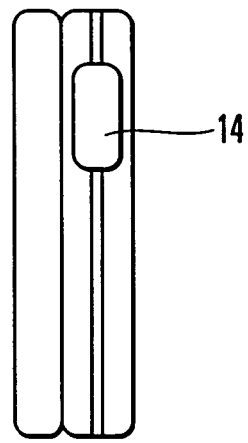
FIG. 5A  FIG. 5B
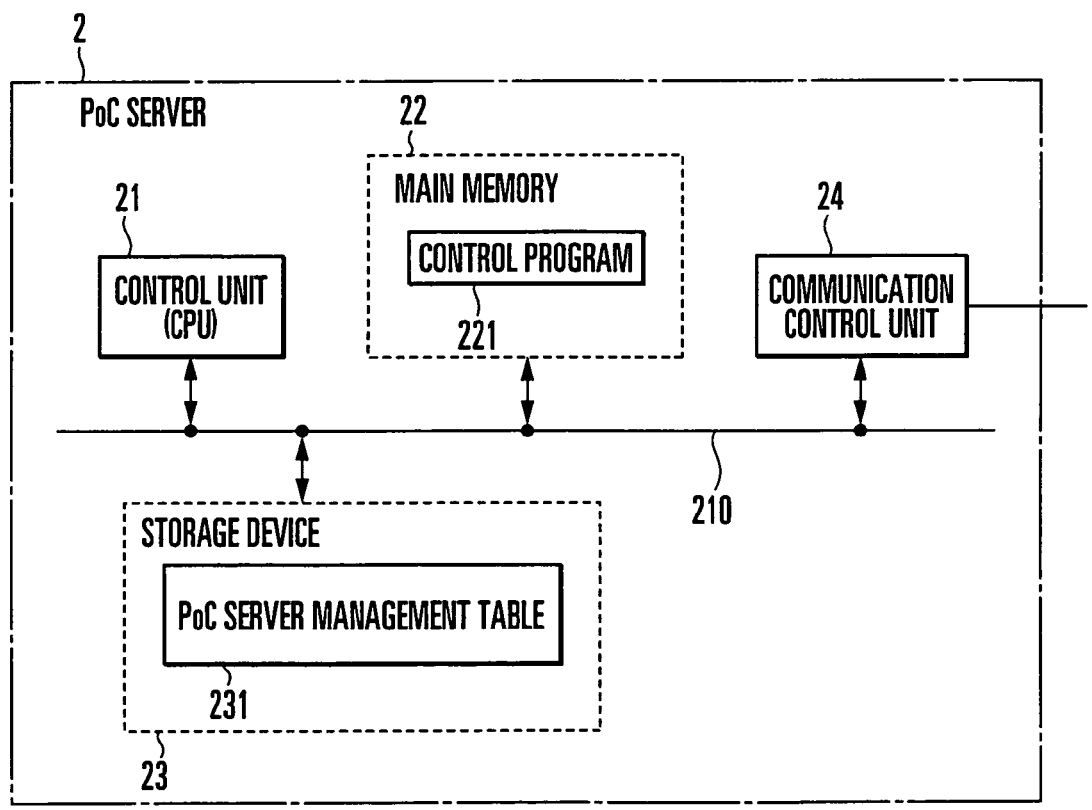
FIG. 6

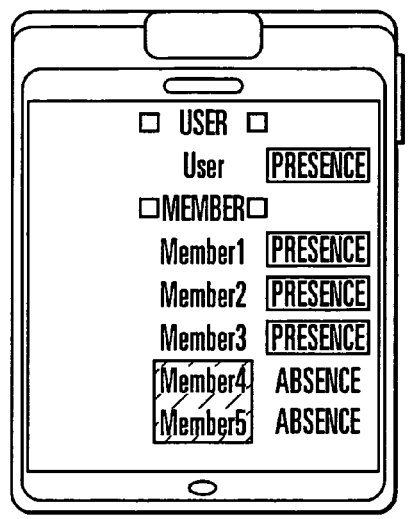
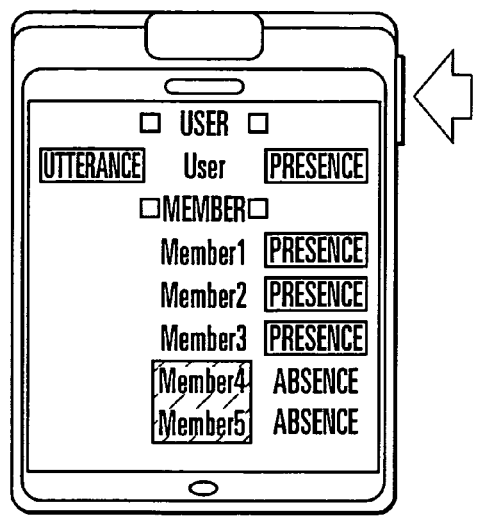
FIG.12A    FIG.12B
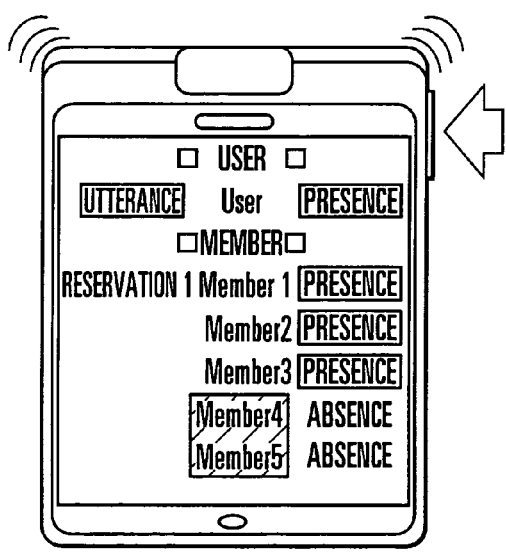
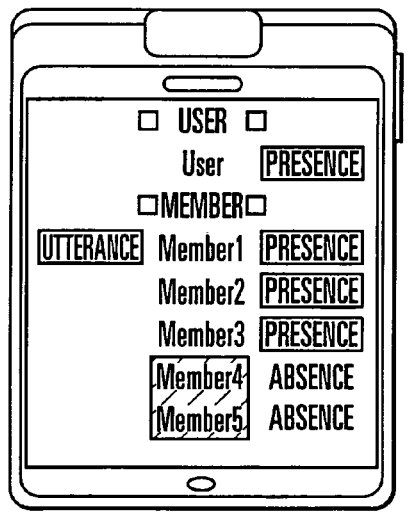
FIG.12C    FIG.12D

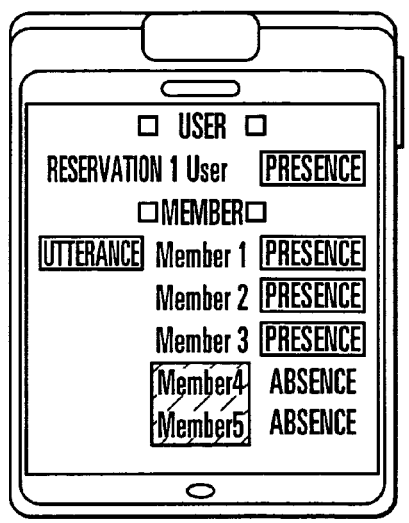
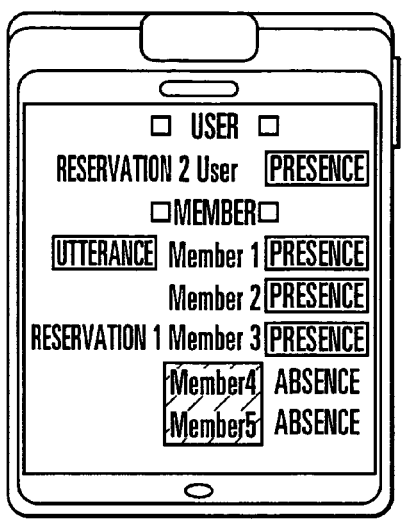
FIG.13A    FIG.13B
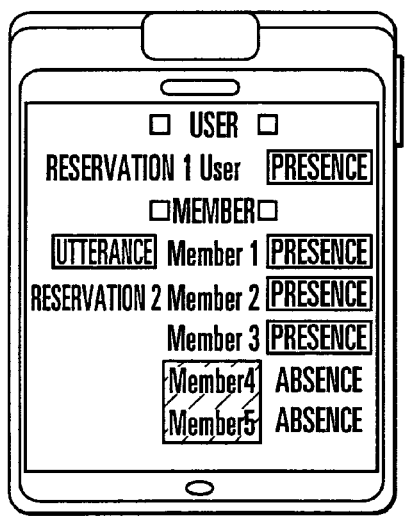
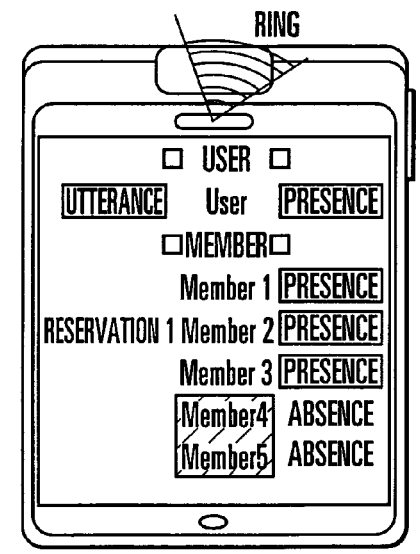
FIG.13C    FIG.13D

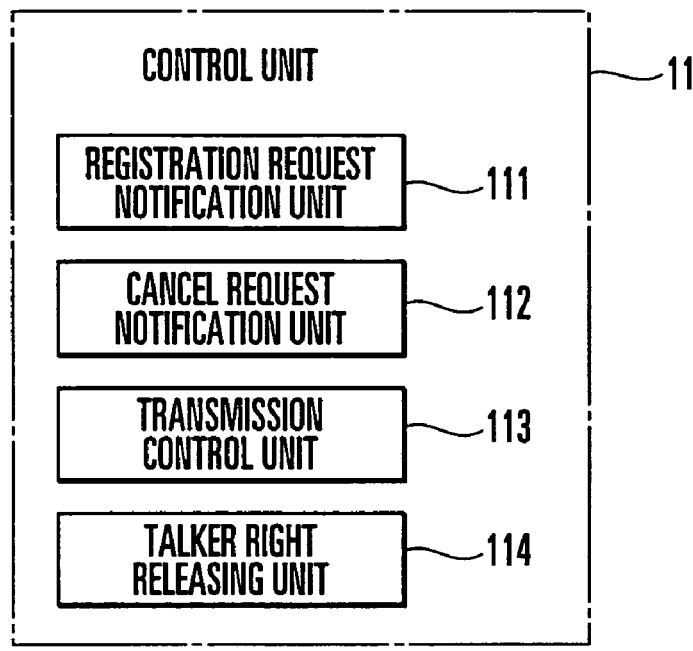
F I G. 15
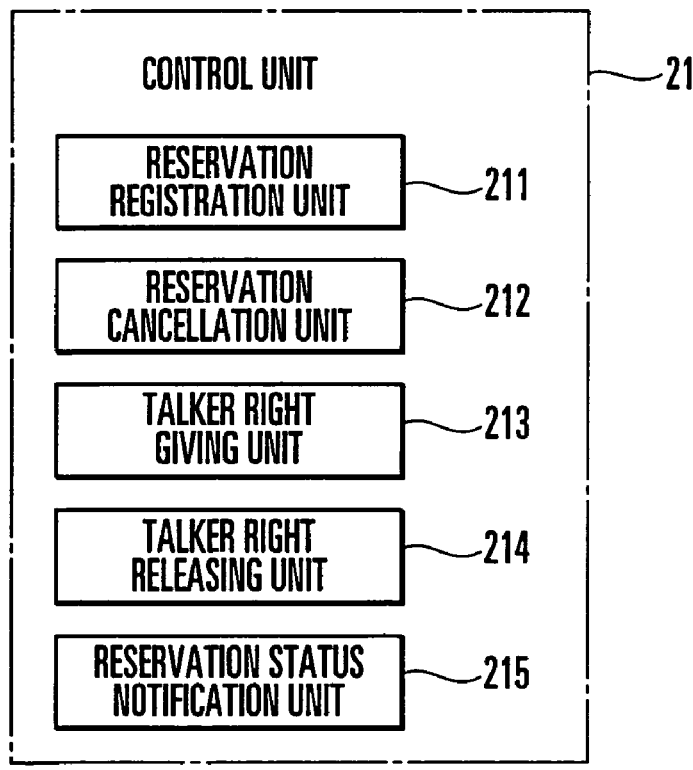
F I G. 16

SPEECH COMMUNICATION SYSTEM AND TALKER RIGHT RESERVATION METHOD

BACKGROUND OF THE INVENTION

The present invention relates to a speech communication system and a talker right reservation method used for the system.

For example, reference 1 (JP 2003-526275) discloses a PoC (Push-to-Talk over Cellular) system based on VoIP (Voice over IP) which allows speech communication between portable terminals on an IP (Internet Protocol) network. In this PoC system, one-to-many speech communication can be performed by using a packet network. However, two or more persons cannot be simultaneously talk. A given person who wants to talk waits until the currently talking person finishes speech, and begins to talk after acquiring the talker right.

The manner of using PoC in a portable terminal is similar to the method of using a transceiver. When a talker keeps the talker right by continuously pressing a dedicated key, uttered speech data is sent to another portable terminal. The user of another portable terminal cannot utter speech but can only receive speech. When the talker right holder releases the dedicated key, the talker right is released. After the right is released, a portable terminal whose dedicated key is pressed first acquires the talker right, and its user can utter speech through the portable terminal.

The talker right in PoC is managed by a PoC server. For example, the PoC server registers members, comprehends participation enable information such as "absence" and "presence" of members and the like (presence function), and assigns the talker right (floor control).

In the above PoC system, in order to acquire the talker right, a talker right acquisition notification must be transmitted to the PoC server after the talker right is released (no one is talking). However, a given user cannot acquire the talker right and cannot utter any speech if another user transmits a talker right acquisition notification ahead of the given user even while no one is talking as well as while someone is talking. Furthermore, if a given user keeps talking and does not release the talker right, other users cannot utter any speech and have no means for sending an intention to utter speech.

SUMMARY OF THE INVENTION

The present invention has been made to solve the above problems, and has as its object to allow users to make reservations for the talker right.

It is another object of the present invention to allow users to easily utter speech by preferentially giving the talker right to the users in the order in which reservations are made after the talker right is released.

According to the present invention, there is provided a speech communication system comprising a plurality of portable terminals, and a sever device which manages a talker right specifying a terminal which transmits speech when speech communication is performed between the portable terminals, the portable terminal comprising a registration request notification unit which transmits, to the server device in response to predetermined external operation, a registration request notification for requesting registration of a reservation for the talker right, and the server device comprising a management table which stores management information containing a reservation status of the talker right, and a reservation registration unit which registers a reservation for the talker right in the management table in accordance with a registration request notification from the portable terminal.

In addition, according to the present invention, there is provided a portable terminal apparatus comprising a transmission control unit which transmits speech to another terminal when a talker right is given by a sever device which manages the talker right specifying a terminal which transmits speech when speech communication is performed between portable terminals, and a registration request notification unit which transmits, to the server device in response to predetermined external operation, a registration request notification for requesting registration of a reservation for the talker right.

Furthermore, according to the present invention, there is provided a talker right reservation method comprising the step of causing a portable terminal to transmit a registration request notification for requesting registration of a reservation for a talker right, to the server device which manages the talker right specifying a terminal which transmits speech when speech communication is performed between a plurality of portable terminals in response to predetermined external operation, and the step of causing the server device to register a reservation for the talker right in a management table which stores management information containing a reservation status of the talker right, in accordance with a registration request notification from the portable terminal.

BRIEF DESCRIPTION OF THE DRAWINGS

FIG. 3 is a sequence chart showing talker right reservation canceling operation in the speech communication system shown in FIG. 1;

FIG. 5A is a front view of the portable terminal according to the first embodiment of the present invention;

FIG. 5B is a side view of the portable terminal according to the first embodiment of the present invention;

FIG. 6 is a block diagram showing the arrangement of a PoC server according to the first embodiment of the present invention;

FIGS. 12A to 12D are views each showing a display example on the display unit of the portable terminal in FIG. 4;

FIGS. 13A to 13D are views each showing a display example on the display unit of the portable terminal in FIG. 4;

FIG. 15 is a functional block diagram of the control unit of the portable terminal in FIG. 4;

FIG. 16 is a functional block diagram of the control unit of the PoC server in FIG. 6;

DESCRIPTION OF THE PREFERRED EMBODIMENTS

Figure 1:
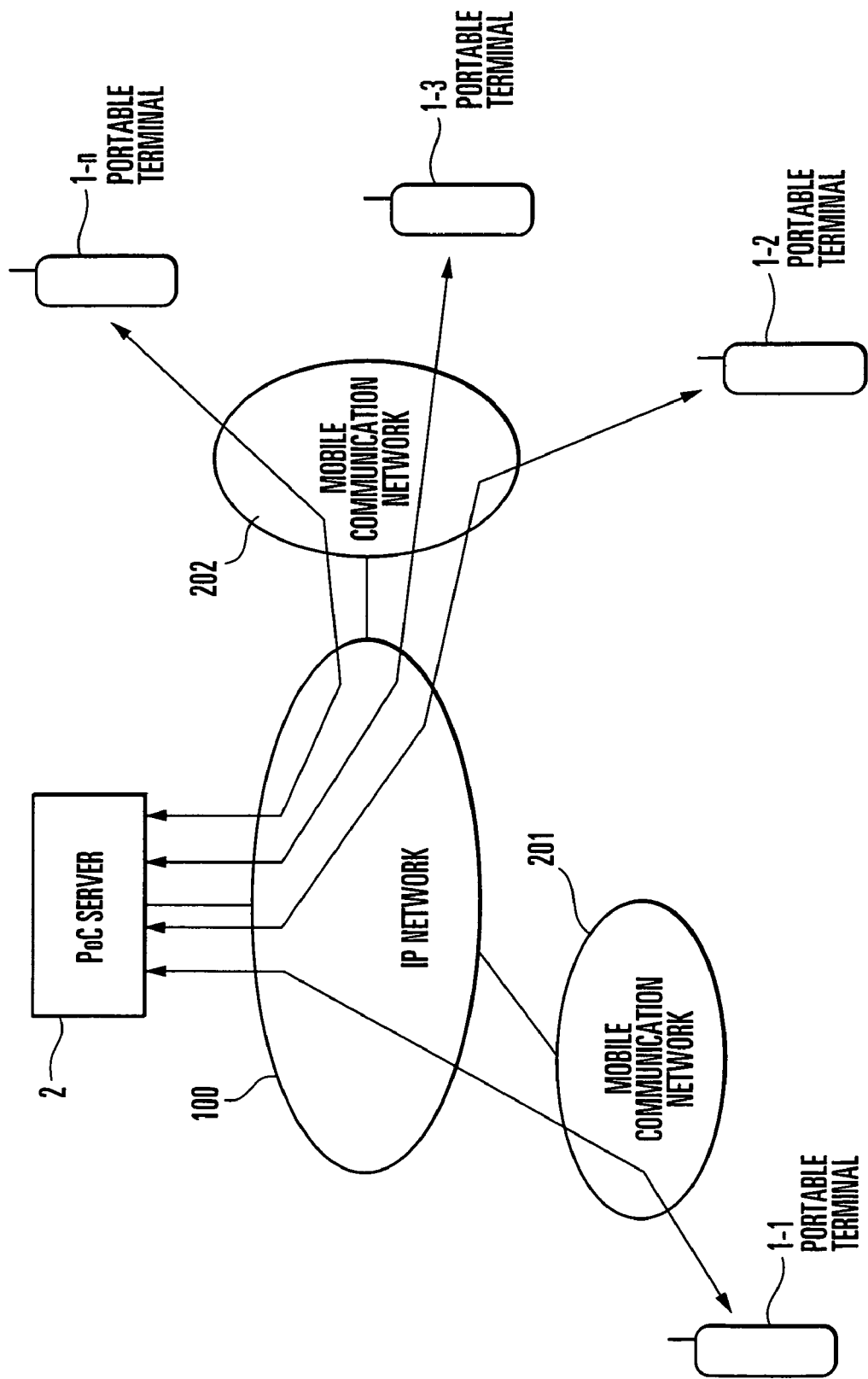
FIG. 1 is a block diagram showing the arrangement of a speech communication system according to the present invention.

An overview of the present invention will be described next with reference to the accompanying drawings. FIG. 1 shows the arrangement of a speech communication system according to the present invention. The speech communication system shown in FIG. 1 is a system which performs half-duplex speech communication between portable terminals (e.g., cellular phones) 1-1 to 1-n, and more particularly, a PoC system in which a PoC server 2 manages the talker right in PoC (Push-to-Talk over Cellular) based on VOIP (Voice over IP) which allows speech communication between the portable terminals 1-1 to 1-n on an IP (Internet Protocol) network 100.

In the speech communication system shown in FIG. 1, the portable terminals 1-1 to 1-n are connected to the PoC server 2 through mobile communication networks 201 and 202 and the IP network 100. The PoC server 2 performs registration of PoC members, talker right assignment (floor control), member state management (presence function), and the like to allow one-to-many speech communication among the portable terminals 1-1 to 1-n.

Figure 2:
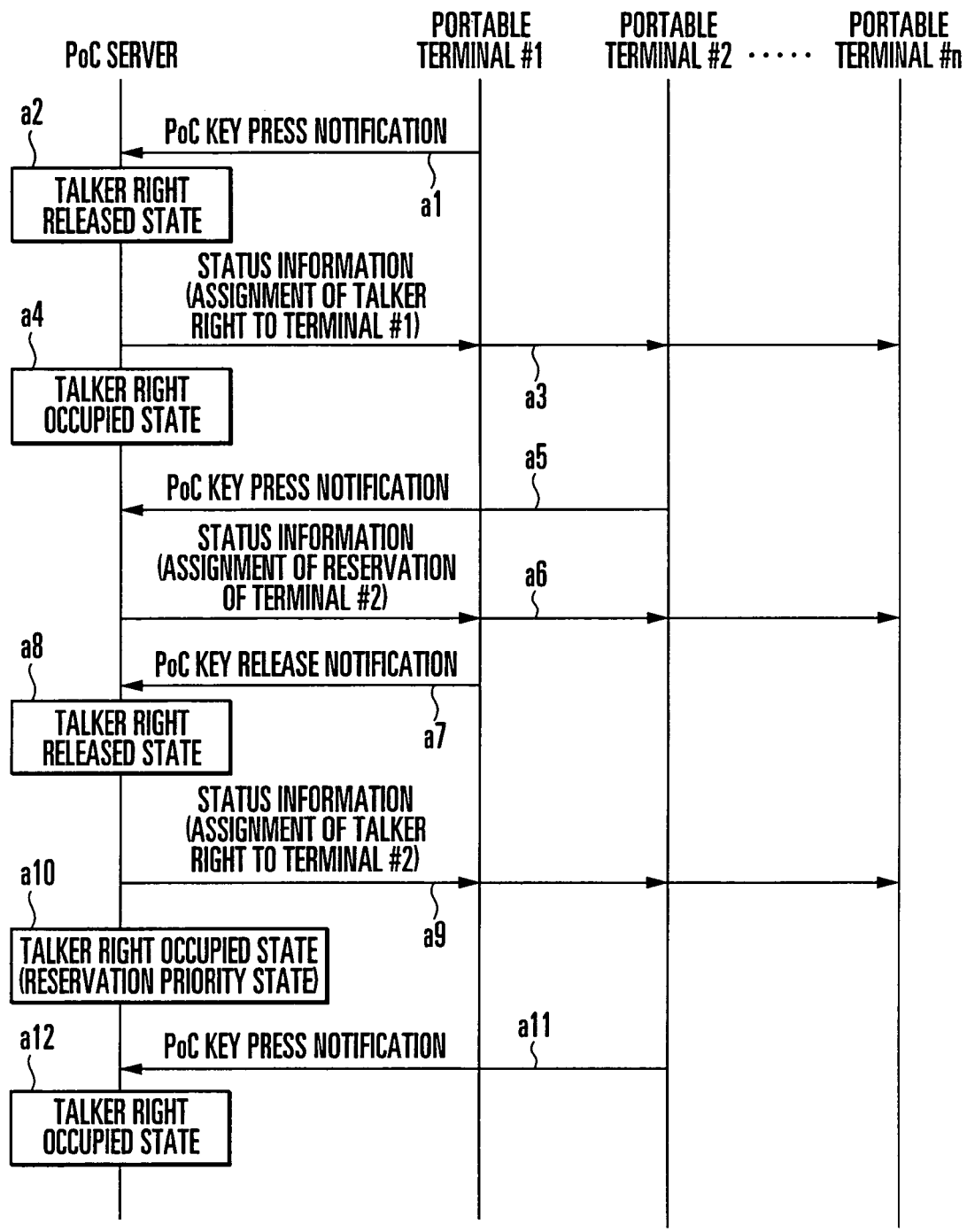
FIG. 2 is a sequence chart showing talker right reserving operation in the speech communication system shown in FIG. 1.

FIG. 2 is a sequence chart showing talker right reserving operation in the speech communication system shown in FIG. 1. FIG. 3 is a sequence chart showing talker right reservation canceling operation in the speech communication system shown in FIG. 1. The operation of the speech communication system shown in FIG. 1 will be described with reference to FIGS. 1 to 3.

In the speech communication system shown in FIG. 1, talker right reservation statuses are provided for a management table (not shown in FIG. 1) in the PoC server 2, and registration and cancellation of reservations are executed in accordance with PoC key (not shown in FIG. 1) press notifications from the portable terminals 1-1 to 1-n.

In the speech communication system shown in FIG. 1, the reservation state managed by the management table is displayed on the portable terminals 1-1 to 1-n, and a terminal which is holding the talker right (e.g., the portable terminal 1-1) notifies the user of reservation addition information by using a vibrator (not shown), thereby assigning the talker right in the order in which reservations are registered (a1 to a12 in FIG. 2). Note that when a PoC key press notification is sent from one of the portable terminals 1-1 to 1-n which is in the reserved state before the talker right is assigned at the time of registration of a reservation, the corresponding reservation is released (b1 to b8 in FIG. 3).

With this operation, in the speech communication system shown in FIG. 1, the talker right can be reserved from the portable terminals 1-1 to 1-n. Notifying PoC members who make conversation in PoC of the reservation makes it possible to urge the corresponding user to release the talker right. In addition, preferentially giving the talker right to a user after the release of the talker right on the basis of the reservation allows the user to easily utter speech.

That is, in the speech communication system shown in FIG. 1, the reservation statuses are provided for the management table in the PoC server 2, and reservation registration and reservation cancellation are switched for the portable terminals 1-1 to 1-n in response to a PoC key press notification from each of the portable terminals 1-1 to 1-n as a trigger, thereby realizing simple reservation and cancellation.

In the speech communication system shown in FIG. 1, reservation numbers are assigned to the reservation statuses in the order in which reservations are registered, and the corresponding status information is displayed on each of the portable terminals 1-1 to 1-n, thereby allowing each user to easily comprehend the reservation state of the talker right.

In addition, the speech communication system shown in FIG. 1, when a reservation is registered, notifying operation is performed in the terminal holding the talker right by, for example, vibrating operation using a vibrator. With this operation, even if a given user is talking while holding a corresponding one of the portable terminals 1-1 to 1-n and hence it is difficult for him/her to check the information on the display unit, the user who is talking can be reliably notified of the addition of the reservation. This makes it possible to urge the user to release the talker right.

When the talker right is released, the talker right is preferentially assigned to one of the portable terminals 1-1 to 1-n which has made a reservation first on the basis of the reservation numbers assigned to the reservation statuses, and the terminal to which the talker right is assigned is made to generate notification sound for a predetermined period of time (e.g., 3 [s]) to inform the user of the acquisition of the talker right. In addition, when the key is pressed during the generation of sound, the user is allowed to keep holding the talker right. If the key is not pressed during the generation of sound, the talker right is released. This makes it possible to prevent any of the portable terminals 1-1 to 1-n with which the user cannot talk because of his/her absence or the like from occupying the talker right, thereby realizing smooth transfer of the talker right.

First Embodiment

Figure 4:
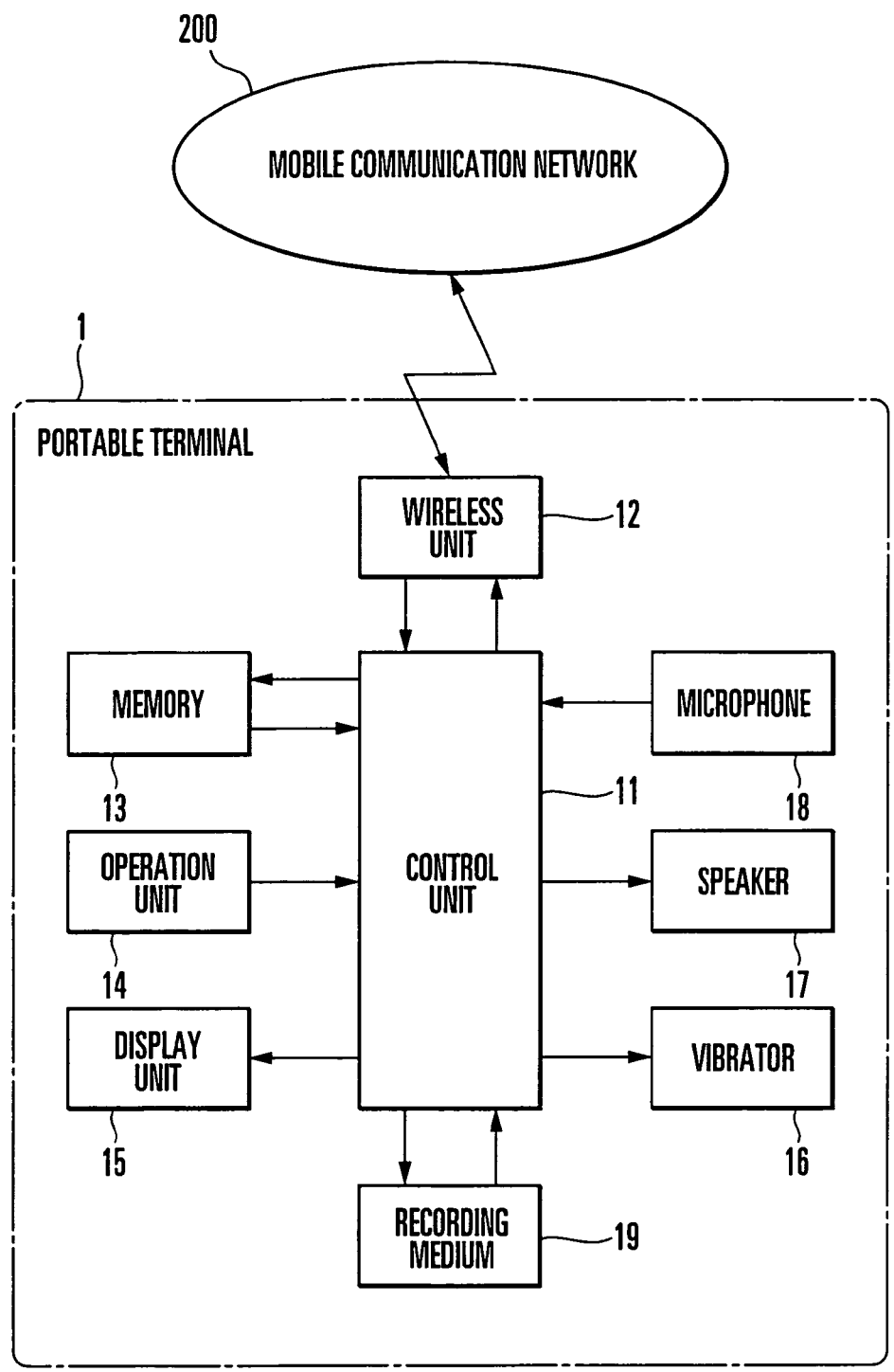
FIG. 4 is a block diagram showing the arrangement of a portable terminal according to the first embodiment of the present invention.

FIG. 4 shows the arrangement of a portable terminal according to the first embodiment of the present invention. FIG. 5A shows the portable terminal according to the first embodiment of the present invention. FIG. 5B shows the portable terminal according to the first embodiment of the present invention. A speech communication system according to the first embodiment of the present invention has the same arrangement as that of the speech communication system shown in FIG. 1 described above. FIGS. 4 and 5A and 5B show the arrangement and outer appearance of each of portable terminals 1-1 to 1-n shown in FIG. 1.

Referring to FIGS. 4 and 5A and 5B, a portable terminal 1 comprises a control unit 11 which controls the operation of the self terminal, a wireless unit 12 which connects to a mobile communication network 200, a memory 13 which holds information, an operation unit 14 which receives an input from a user to the self terminal, a display unit 15 which displays information delivered to the user of the self terminal, a vibrator (vibration generating unit) 16 which generates vibrations, a speaker (sounding unit) 17 which outputs speech, a microphone 18 which receives and inputs speech, a recording medium 19 which stores a program executed by the control unit 11.

FIG. 6 shows the arrangement of a PoC server according to the first embodiment of the present invention. FIG. 6 shows the arrangement of a PoC server 2 shown in FIG. 1. Referring to FIG. 6, the PoC server 2 comprises a control unit (CPU: Central Processing Unit) 21, a main memory 22 which stores a control program 221 executed by the control unit 21, a storage device 23 which stores a PoC server management table 231, and a communication control unit 24 which controls communication through an IP network 100. The control unit 21, main memory 22, storage device 23, and communication control unit 24 are connected to each other through an internal bus 210. The control program 221 is provided while being recorded on a recording medium such as a magnetic disk or an optical disk.

Table 1 shows an example of the arrangement of the PoC server management table 231. In table 1, the PoC server management table 231 stores, for each PoC group (A, B, C, . . . ), a member ID (1 to 6, . . . ), PoC member [member (#1 to #6)] information, a member address (e.g., "090123456○○", "080456987○○", "080987654○○", "090654321○○", "090321654○○", and "080789456○○"), PoC participation ("○" or "X"), presence ("resting room", "dining room", "laboratory", "outing", "meeting room", "sitting", or the like), PoC key press information ("○", "X", or "−"), a talker right ("○" or "−"), and a talker right reservation ("reservation 1", "reservation 2", . . . ).

portable terminal 1 may send a PoC key press notification to the PoC server 2 at predetermined time intervals.

Figure 7:
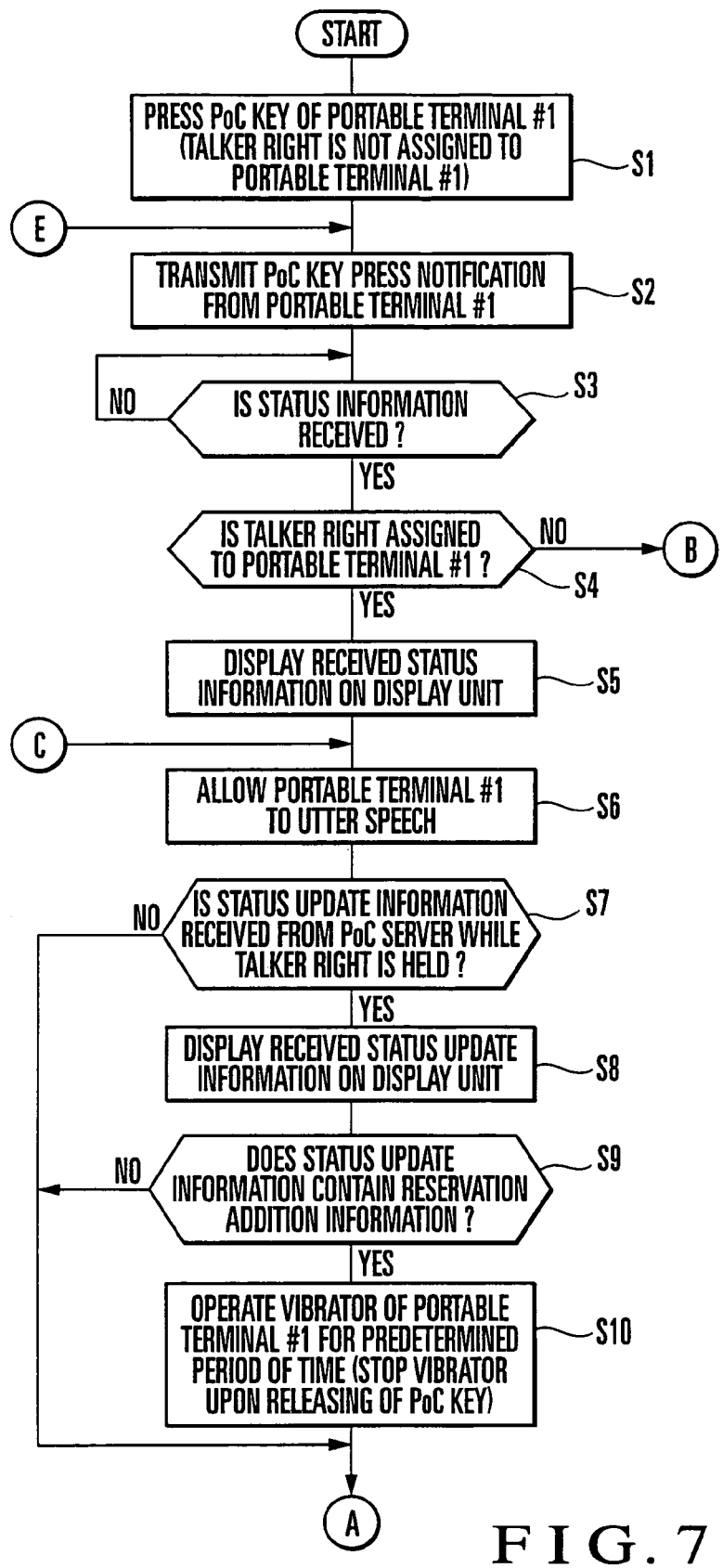
FIG. 7 is a flowchart showing the operation of the portable terminal in FIG. 4.
Figure 8:
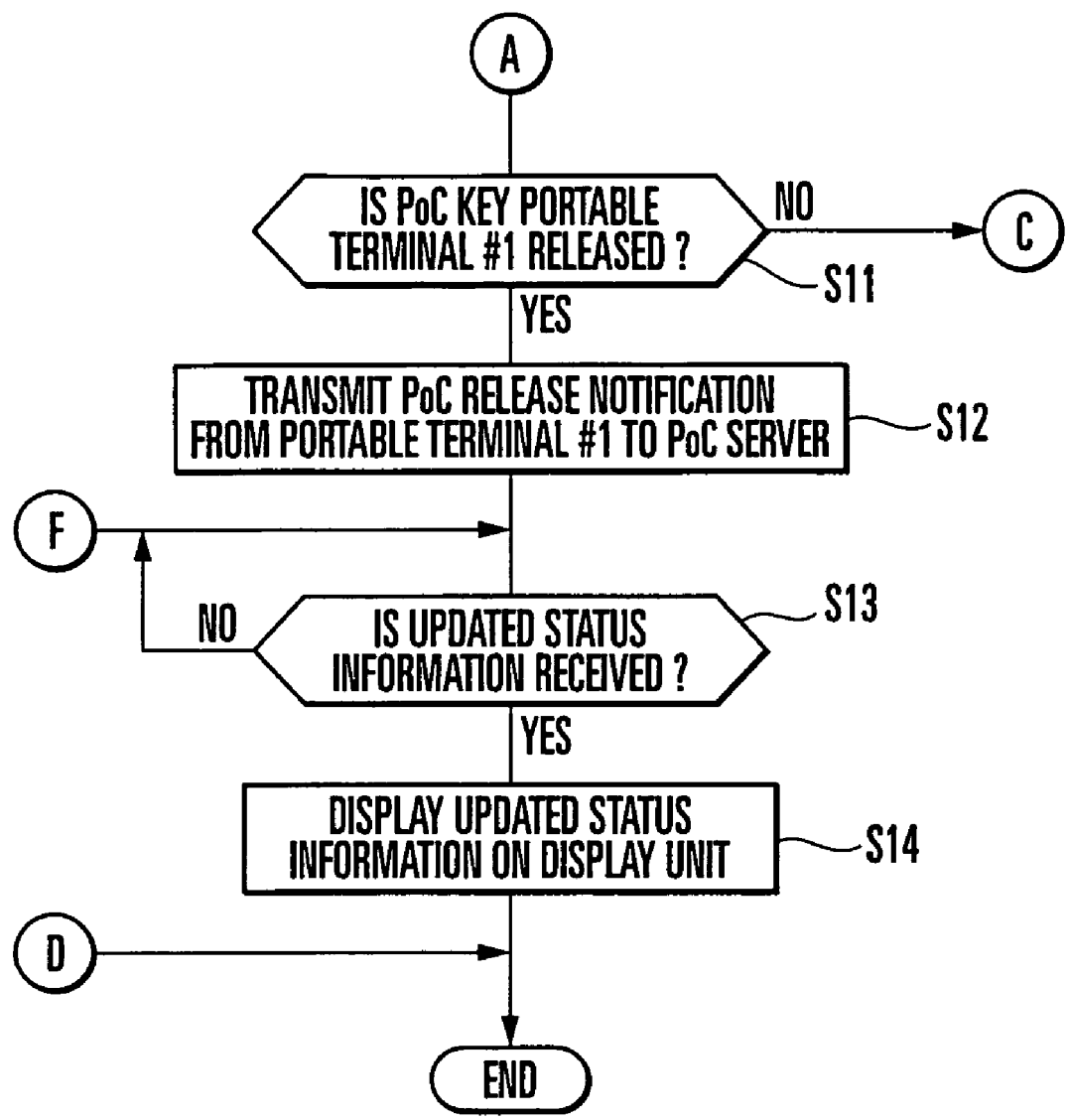
FIG. 8 is a flowchart showing the operation of the portable terminal in FIG. 4.
Figure 9:
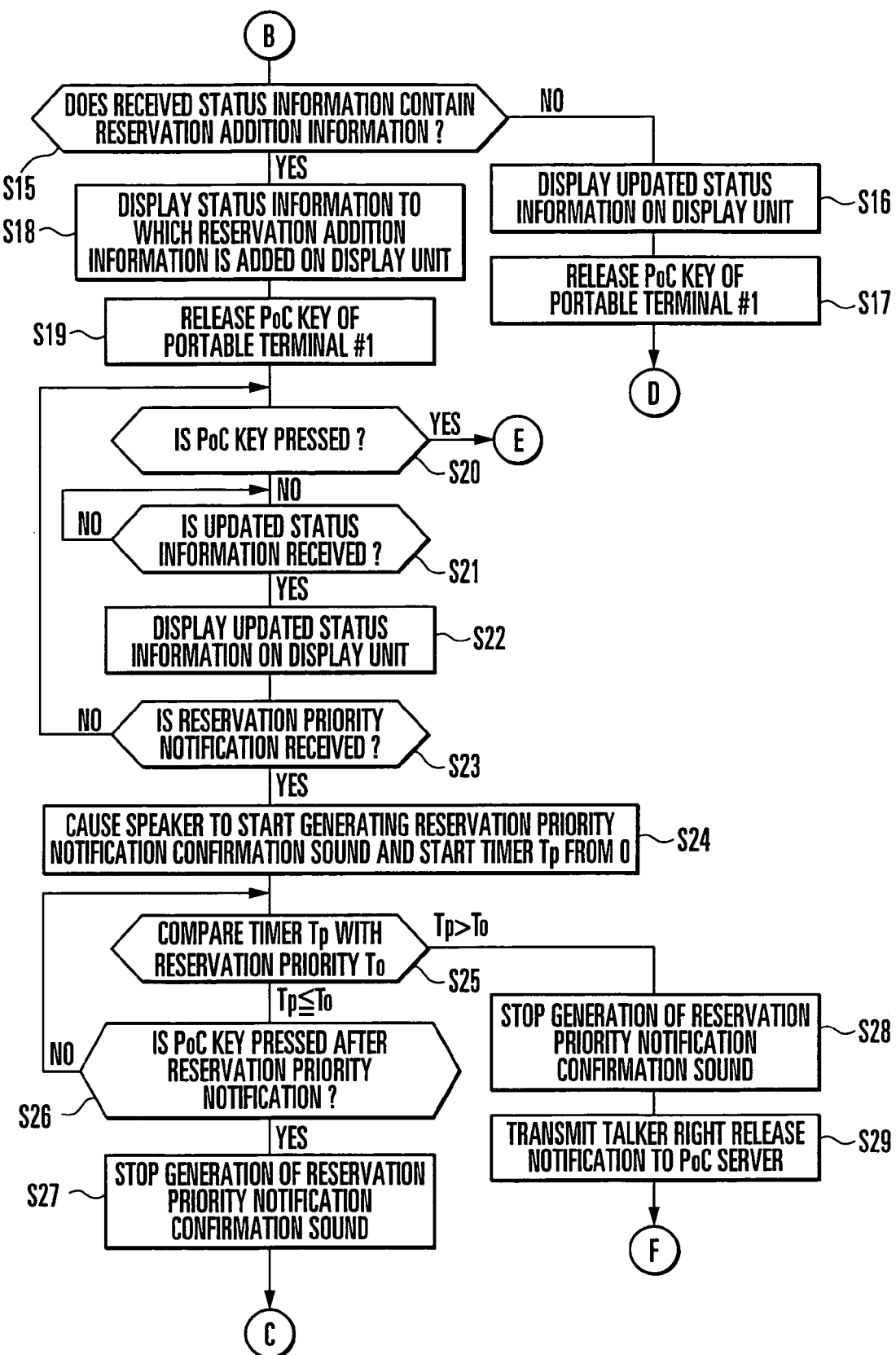
FIG. 9 is a flowchart showing the operation of the portable terminal in FIG. 4.
Figure 10:
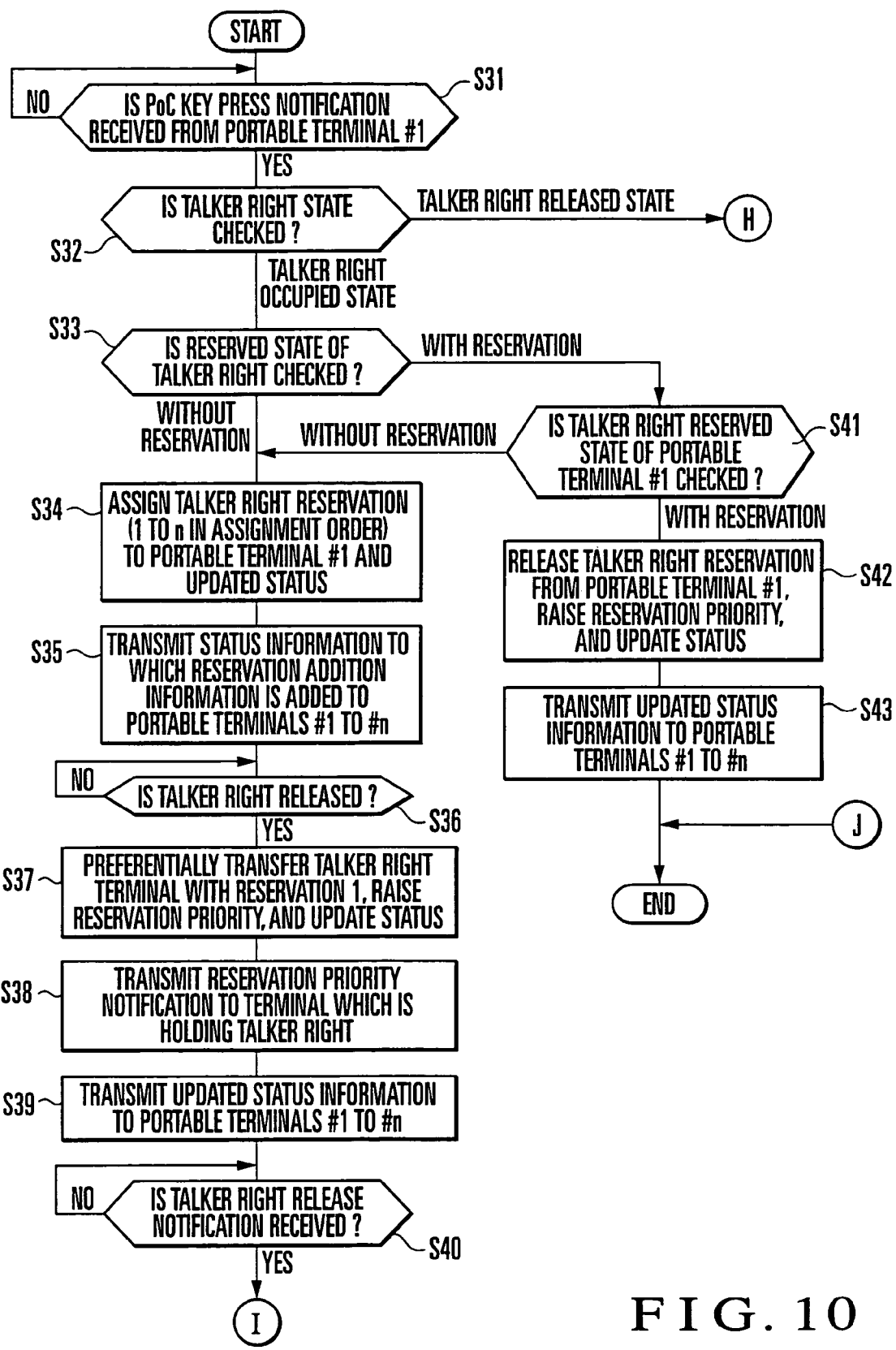
FIG. 10 is a flowchart showing the operation of the PoC server in FIG. 6.
Figure 11:
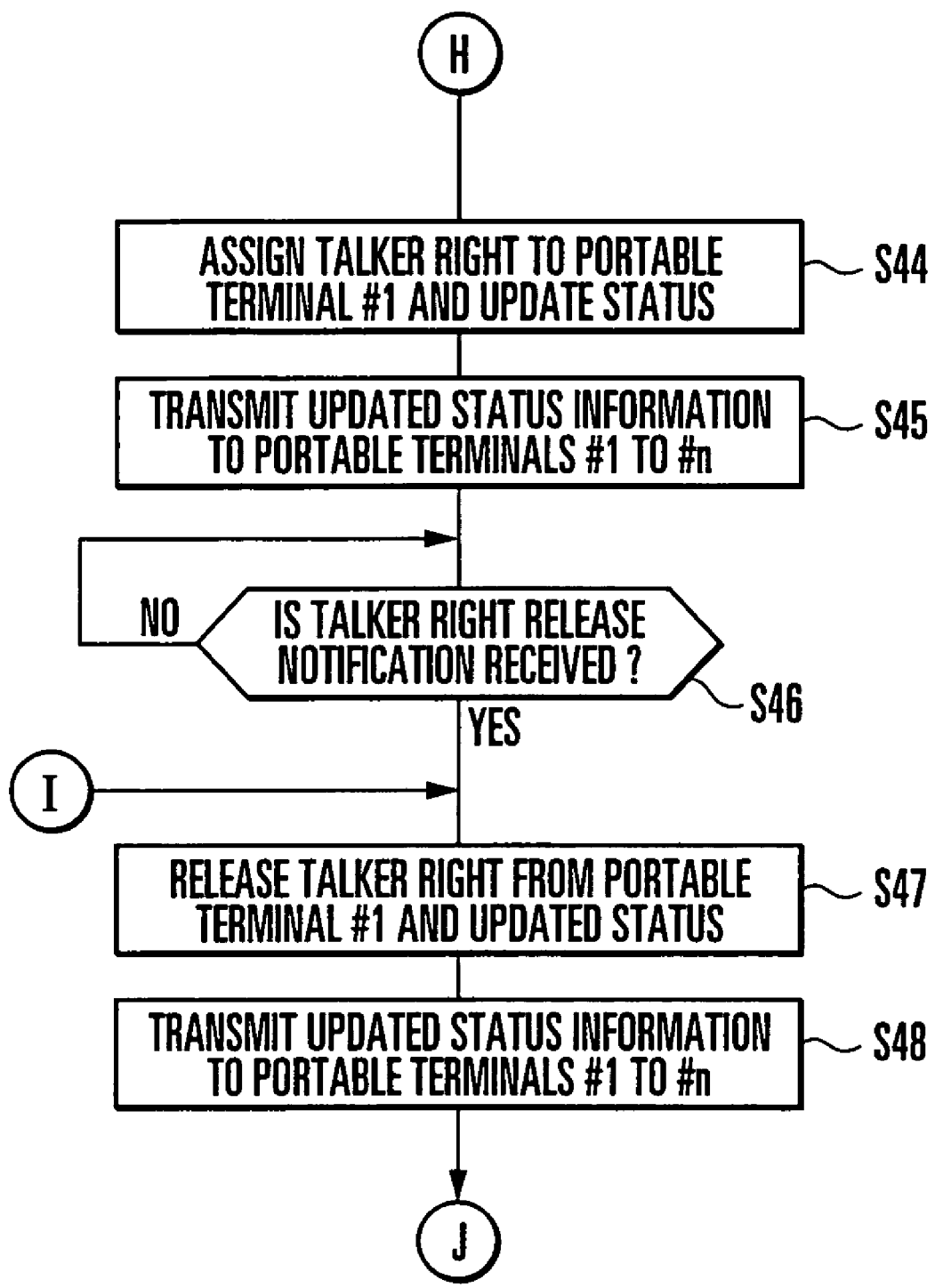
FIG. 11 is a flowchart showing the operation of the PoC server in FIG. 6.
Figure 14:
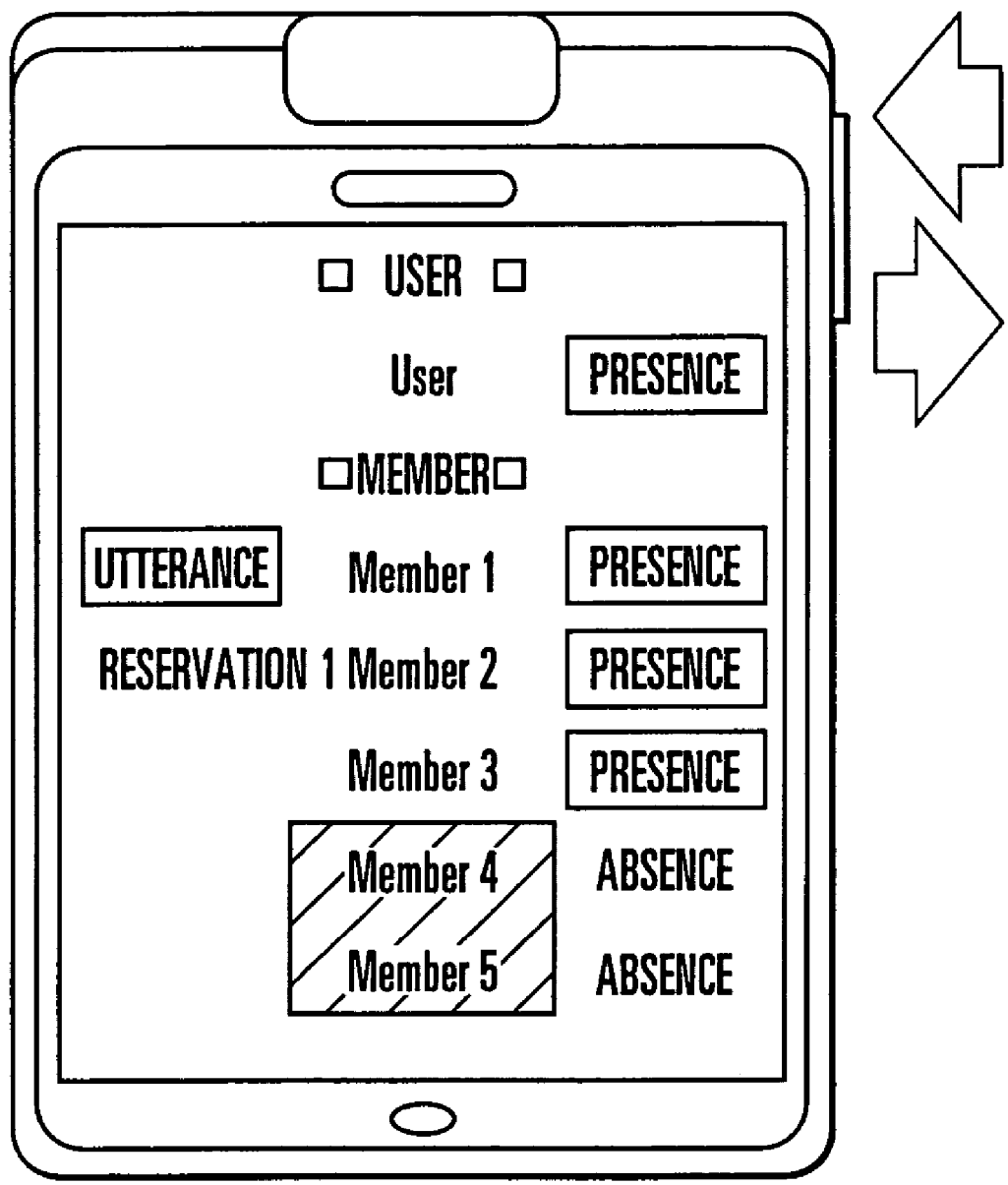
FIG. 14 is a view showing a display example on the display unit of the portable terminal in FIG. 4.

FIGS. 7 to 9 show the operation of the portable terminal 1 in FIG. 4. FIGS. 10 and 11 show the operation of the PoC server 2 in FIG. 6. FIGS. 12A to 12D, 13A to 13D, and 14 show display examples on the display unit 15 of the portable terminal 1 in FIG. 4. The operation of the speech communication system according to the first embodiment of the present invention will be described below with reference to FIGS. 1 and 4 to 14. The processes shown in FIGS. 7 to 9 are realized when the control unit 11 executes programs in the recording medium 19. The processes shown in FIGS. 10 and 11 are realized when the control unit 21 executes the control program 221.

In the following description, the portable terminal 1-1 (written as portable terminal #1 in the flowcharts) is regarded as a self terminal, and n portable terminals 1-1 to 1-n are registered as PoC members in the PoC server 2 to be set in a PoC speech communication enable state.

FIGS. 12A to 12D, 13A to 13D, and 14 show status display examples displayed on the display unit 15 in PoC operation. In these drawings, the self terminal is named "User", and PoC registered members are named "User", "Member 1", "Member 2", "Member 3", "Member 4", and "Member 5". Of these registered members, portable terminals in the PoC speech communication enable state are "User", "Member 1", "Mem-

TABLE 1

| PoC Group | Member ID | PoC Member | Member Address | PoC Participation | presence | PoC Key Press | Talker Right | Talker Right Reservation |
|---|---|---|---|---|---|---|---|---|
| A | 1 | member #1 | 090123456○○ | ○ | resting room | ○ | ○ | — |
|   | 2 | member #2 | 080456987○○ | ○ | dining room | X | — | reservation 2 |
|   | 3 | member #3 | 080987654○○ | ○ | laboratory | X | — | — |
|   | 4 | member #4 | 090654321○○ | X | outing | — | — | — |
|   | 5 | member #5 | 090321654○○ | X | meeting room | — | — | — |
|   | 6 | member #6 | 080789456○○ | ○ | sitting | X | — | reservation 1 |
|   | . | . | . | . | . | . | . | . |
|   | . | . | . | . | . | . | . | . |
|   | . | . | . | . | . | . | . | . |
| B | . | . | . | . | . | . | . | . |
|   | . | . | . | . | . | . | . | . |
|   | . | . | . | . | . | . | . | . |
| C | . | . | . | . | . | . | . | . |
|   | . | . | . | . | . | . | . | . |
|   | . | . | . | . | . | . | . | . |
|   | . | . | . | . | . | . | . | . |
|   | . | . | . | . | . | . | . | . |
|   | . | . | . | . | . | . | . | . |

Note that in the POC server management table 231, cellular phone numbers are used as member addresses. However, no problem arises when the addresses of the members are IP addresses or the like. If the talker right is not given to any user on the basis of a talker right reservation (for example, a talker right reservation times out) within a predetermined period of time after the talker right reservation is registered in the PoC server management table 231, the control unit 21 may cancel the talker right reservation. In this case, when the talker right reservation times out, the portable terminal 1 may send a PoC key press notification to the PoC server 2. Alternatively, in anticipating that the talker right reservation will time out, the ber 2", and "Member 3" with the presence display "presence in room", and "Member 4" and "Member 5" with the present display "absence" are in the PoC speech communication disable state.

In a state wherein PoC communication can be done and the self terminal (portable terminal #1) is not holding the talker right, processing is started. In this case, a key exclusively assigned for PoC in the operation unit 14 is regarded as a PoC key. When the talker right is to be acquired with the self terminal (portable terminal #1), this PoC key is pressed (step S1 in FIG. 7). In response to the pressing of the PoC key as a trigger, the portable terminal 1 transmits a PoC press notification to the PoC server 2 (step S2 in FIG. 7).

Upon receiving the PoC key press notification (step S31 in FIG. 10), the PoC server 2 checks, in the PoC server management table 231, to which portable terminal the talker right has been assigned (step S32 in FIG. 10). If the talker right is not assigned to any user (talker right released state), the PoC server 2 assigns the talker right to portable terminal #1, and updates the status (step S44 in FIG. 11). The PoC server 2 then transmits the updated status information to each of portable terminals #1 to #n (step S45 in FIG. 11).

Portable terminal #1 receives the status information (step S3 in FIG. 7). If the talker right is assigned with this status information (step S4 in FIG. 7), the status displayed on the display unit 15 is updated, and the assignment of the talker right is displayed (step S5 in FIG. 7). The status display representing the talker right released state on the display unit 15 becomes like that shown in FIG. 12A. When the talker right is acquired by pressing the PoC key, the resultant display becomes like that shown in FIG. 12B. The "utterance" icon is displayed on the left of "User" to indicate who is a talker (talker right holder). In this state, the user can utter speech with portable terminal #1 named "User" (step S6 in FIG. 7).

If portable terminal #1 receives status update information from the PoC server 2 while holding the talker right, portable terminal #1 (step S7 in FIG. 7) updates and displays the status displayed on the display unit 15 (step S8 in FIG. 7), thereby notifying the user that the status has been updated. If the status update information contains reservation addition information (step S9 in FIG. 7), the terminal which is holding the talker right (portable terminal #1) operates the vibrator 16 for a predetermined period of time (step S10 in FIG. 7), thereby notifying the user of the addition of a reservation. FIG. 12C shows the status display at this time.

When a reservation from another portable terminal (Member 1) is added, portable terminal #1 displays the "reservation 1" icon on the left of "Member 1", and the vibrator 16 is operated, thereby notifying the user who is holding the talker right of the addition of the reservation. In each portable terminal other than the portable terminal which is holding the talker right, the vibrator 16 is not operated, and only the status display is updated. The addition of a reservation will be described later.

Unless the PoC key of portable terminal #1 which is holding the talker right is released, the talker right resides in portable terminal #1. When the PoC key is released (step S11 in FIG. 8), the PoC key release notification is transmitted to the PoC server 2 (step S12 in FIG. 8).

Upon receiving the PoC key release notification from portable terminal #1 (step S46 in FIG. 11), the PoC server 2 releases the talker right from portable terminal #1 and updates the status (step S47 in FIG. 11), and transmits the updated status information to each of portable terminals #1 to #n (step S48 in FIG. 11).

Upon receiving the updated status information from the PoC server 2 (step S13 in FIG. 8), portable terminal #1 updates and displays the status display on the display unit 15 (step S14 in FIG. 8), and the user terminates the utterance through portable terminal #1. The terminated state of portable terminal #1 is a state wherein PoC communication can be performed and the self terminal (portable terminal #1) is not holding the talker right. This state is the same as that at the start of the processing described above, and hence repetitive operation from step S1 can be performed.

Referring to FIGS. 12A to 12D, if the self terminal (User) is holding the talker right and no reservations are made from other portable terminals (see FIG. 12B), the "utterance" icon on the left of "User" is tuned off (see FIG. 12A) when the talker right is released.

In this embodiment, talker right reservation statuses are prepared for the PoC server management table 231 of the PoC server 2 to manage reservation numbers (reservations 1 to n) assigned in the order in which reservations made from portable terminals #1 to #n are registered. If portable terminal #1 is not holding the talker right and another portable terminal is occupying the talker right when the PoC key is pressed (step S32 in FIG. 10), the PoC server 2 checks the reserved state of the talker right in the PoC server management table 231 (step S33 in FIG. 10).

If there is no reservation or if the presence of reservations is determined in step S33 and the reservations include no reservation from the self terminal (portable terminal #1) (step S41 in FIG. 10), the talker right reservations are assigned to the portable terminals in order of reception, and the statuses are updated (step S34 in FIG. 10). Status information to which the reservation addition information is added is transmitted to each of portable terminals #1 to #n (step S35 in FIG. 10).

Upon receiving from the PoC server 2 the status information to which the reservation addition information is added (step S15 in FIG. 9), portable terminal #1 updates and displays the status display on the display unit 15 on the basis of the status information to which the reservation addition information is added (step S18 in FIG. 9). At this time, the terminal which is holding the talker right operates the vibrator 16 as well as performing the above processing. With this operation, the reservation made from portable terminal #1 is complete, and the PoC key is released (step S19 in FIG. 9).

FIG. 12D shows a display example in a case wherein the talker right is assigned to another portable terminal and there is no reservation. At this time, when the PoC key is pressed, the "reservation 1" icon is displayed on the left of the self terminal "User", and a reservation is executed (see FIG. 13A). If a reservation has already been made, since the reservation is assigned in reservation order (in order of reception), the "reservation 2" icon is displayed in the case of the second reservation (see FIG. 13B).

If the talker right is released (step S36 in FIG. 10) while portable terminal #1 is in a reserved state and the PoC key is not pressed (step S20 in FIG. 9), the PoC server 2 preferentially assigns the talker right to the (reservation 1) terminal which has made the first reservation, and updates the status by increasing the reservation priority (step S37 in FIG. 10). At this time, the PoC server 2 transmits a reservation priority notification to the terminal which has acquired the talker right by the reservation (step S38 in FIG. 10), and transmits the updated status information to each of portable terminals #1 to #n (step S39 in FIG. 10).

Upon receiving the updated status information from the PoC server 2 (step S21 in FIG. 9), portable terminal #1 updates and displays the status display on the display unit 15 on the basis of the updated status information (step S22 in FIG. 9). At this time, if portable terminal #1 receives a reservation priority notification upon being preferentially assigned the talker right from reservation 1 (step S23 in FIG. 9), portable terminal #1 causes the speaker 17 to start generating notification sound (reservation priority notification confirmation sound). Portable terminal #1 then starts a timer Tp from 0 (step S24 in FIG. 9). FIG. 13 shows a display example at this time.

As shown in FIG. 13C, when another terminal (Member 1) which has the talker right releases the talker right while a reservation is made, the talker right is moved to "User" (portable terminal #1) with "reservation 1", and the resultant status display indicates that "reservation 2" of "Member 2" is raised in priority to "reservation 1". In response to the reservation priority notification, notification sound is generated from the speaker 17 (see FIG. 13D).

In portable terminal #1, the timer Tp is compared with reservation priority time To (e.g., 3 [s]) (step S25 in FIG. 9). If the PoC key of portable terminal #1 is pressed while the timer Tp falls within the reservation priority time To (step S26 in FIG. 9), the generation of reservation priority notification confirmation sound is stopped (step S27 in FIG. 9), and portable terminal #1 is allowed as a terminal who is holding the talker right to utter speech (step S6 in FIG. 7).

If the timer Tp exceeds the reservation priority time To while the PoC key of portable terminal #1 is not pressed (step S25 in FIG. 9), the generation of the reservation priority notification confirmation sound is stopped (step S28 in FIG. 9), and a talker right release notification is transmitted from portable terminal #1 (step S29 in FIG. 9).

Upon receiving the talker right release notification from portable terminal #1 (step S40 in FIG. 10), the PoC server 2 releases the talker right assigned to portable terminal #1, and updates the status (step S47 in FIG. 11). The PoC server 2 then transmits the updated status information to each of portable terminals #1 to #n (step S48 in FIG. 11).

If the PoC key of portable terminal #1 is pressed while the self terminal (portable terminal #1) is in the reserved state (step S41 in FIG. 10), the PoC server 2 releases the talker right reservation of portable terminal #1, and updates the status by raising the reservation priority in accordance with the released reservation (step S42 in FIG. 10). The PoC server 2 then transmits the updated status information to each of portable terminals #1 to #n (step S43 in FIG. 10).

If portable terminal #1 does not receive the status information to which the reservation addition information is added from the PoC server 2 (step S15 in FIG. 9), portable terminal #1 updates and displays the status display on the display unit 15 (step S16 in FIG. 9), and the user releases the PoC key, thereby completing cancellation of the reservation. FIGS. 13A to 13D and 14 show status display examples at the time of reservation cancellation. When the PoC key of the self terminal (User) is pressed in the reserved state shown in FIG. 13C, the reservation icon of "User" is erased, and the reservation priority of another portable terminal "Member 2" is raised from "reservation 2" to "reservation 1".

As described above, in this embodiment, reservation statuses are provided for the PoC server management table 231 of the PoC server 2, and reservation registration and reservation cancellation of each of portable terminals 1-1 to 1-n are switched in response to a PoC key press notification from each of portable terminals 1-1 to 1-n as a trigger, thereby realizing easy reservation and cancellation.

In addition, in this embodiment, reservation numbers are assigned to the reservation statuses in the PoC server management table 231 in the order in which reservations are registered, and the resultant status information is displayed on each of portable terminals 1-1 to 1-n, thereby allowing each user to easily comprehend the reserved state.

Furthermore, in this embodiment, when a reservation is registered, the terminal which is holding the talker right makes the vibrator 16 vibrate. This makes it possible to reliably notify the user who is talking of the addition of the reservation and urge the user to release the talker right even while the user is talking with a corresponding one of portable terminals 1-1 to 1-n and it is difficult to make a check on the display unit 15.

Moreover, in this embodiment, when the talker right is released, the talker right is preferentially assigned to one of portable terminals 1-1 to 1-n which has made the first reservation on the basis of the reservation numbers of the reservation statuses, and the portable terminal to which the talker right is assigned is made to generate notification sound for a predetermined period of time (e.g., 3 [s]), thereby informing the user of the acquisition of the talker right. If the PoC key is pressed during sounding, the user is allowed to keep holding the talker right. If the PoC key is not pressed during sounding, the talker right is released. This can prevent one of the users of portable terminals 1-1 to 1-n who cannot talk because of his/her absence or the like from occupying the talker right, thereby realizing smooth transfer of the talker right.

In this embodiment, the talker right is released when the PoC key is released. However, a maximum occupation time (e.g., 120 [s]) in which the talker right can be held may be provided, so that when this maximum occupation time comes close to running out, the user may be notified of this by notification sound. When the maximum occupation time runs out, the user may release the talker right. At this time, it suffices to additionally perform control to shorten the maximum occupation time in accordance with the number of terminals in the reservation wait state or perform control to change the maximum occupation time to a uniform predetermined time (e.g., 20 [s]) at the time of addition of the first reservation.

FIG. 15 shows the control unit of a portable terminal. The control unit 11 of the portable terminal 1 executes programs in the recording medium 19 to implement a registration request notification unit 111, cancel request notification unit 112, transmission control unit 113, and talker right releasing unit 114 shown in FIG. 15.

The registration request notification unit 111 transmits a registration request notification (e.g., a PoC key press notification) for requesting the registration of the reservation for the talker right to the PoC server 2 in response to predetermined external operation (e.g., PoC key pressing). More specifically, the operation of step S1→ step S2 in FIG. 7 is executed.

The cancel request notification unit 112 transmits a cancel request notification for requesting the cancellation of the reservation for the talker right to the PoC server 2 in response to another predetermined operation different from the predetermined operation for the registration of the reservation for the talker right. For example, when the PoC key is pressed second time before the acquisition of the talker right after a PoC key press notification is transmitted as a registration request notification upon pressing of the PoC key first time. More specifically, operation of step S20→ step S2 in FIG. 7 is executed.

When the talker right is given by the PoC server 2, the transmission control unit 113 performs control to transmit speech to another terminal.

The talker right releasing unit 114 releases the acquired talker right when predetermined operation is not executed before notification of the acquisition of the talker right by the registration of the reservation for the talker right is complete. More specifically, operation in step S29 in FIG. 9 is executed.

FIG. 16 shows the control unit of PoC server. The control unit 21 of the PoC server 2 executes the control program 221 in the main memory 22 to implement a reservation registration unit 211, reservation cancellation unit 212, talker right giving unit 213, talker right releasing unit 214, and reservation status notification unit 215 shown in FIG. 16.

The reservation registration unit 211 registers the reservation for the talker right in the PoC server management table 231 in accordance with a registration request notification from the portable terminal 1. More specifically, operation in step S34 in FIG. 10 is executed.

The reservation cancellation unit 212 cancels the reservation for the talker right in the PoC server management table 231 in accordance with a cancel request notification from the portable terminal 1. More specifically, operation in step S42 in FIG. 10 is executed.

When the talker right given to another terminal is released, the talker right giving unit 213 gives the talker right to one of the terminals whose reservations for the talker right are registered in the PoC server management table 231. More specifically, operation in step S37 in FIG. 10 is executed.

The talker right releasing unit 214 releases the talker right from the portable terminal 1 in accordance with a talker right release notification (e.g., a PoC key release notification) from the portable terminal 1 to which the talker right is given. More specifically, operation in step S47 in FIG. 11 is executed.

The reservation status notification unit 215 notifies each portable terminal 1 of the reservation status stored in the PoC server management table 231. More specifically, operation in steps S35, S39, S43, S45, and S48 in FIG. 10 is executed.

Second Embodiment

Figure 17:
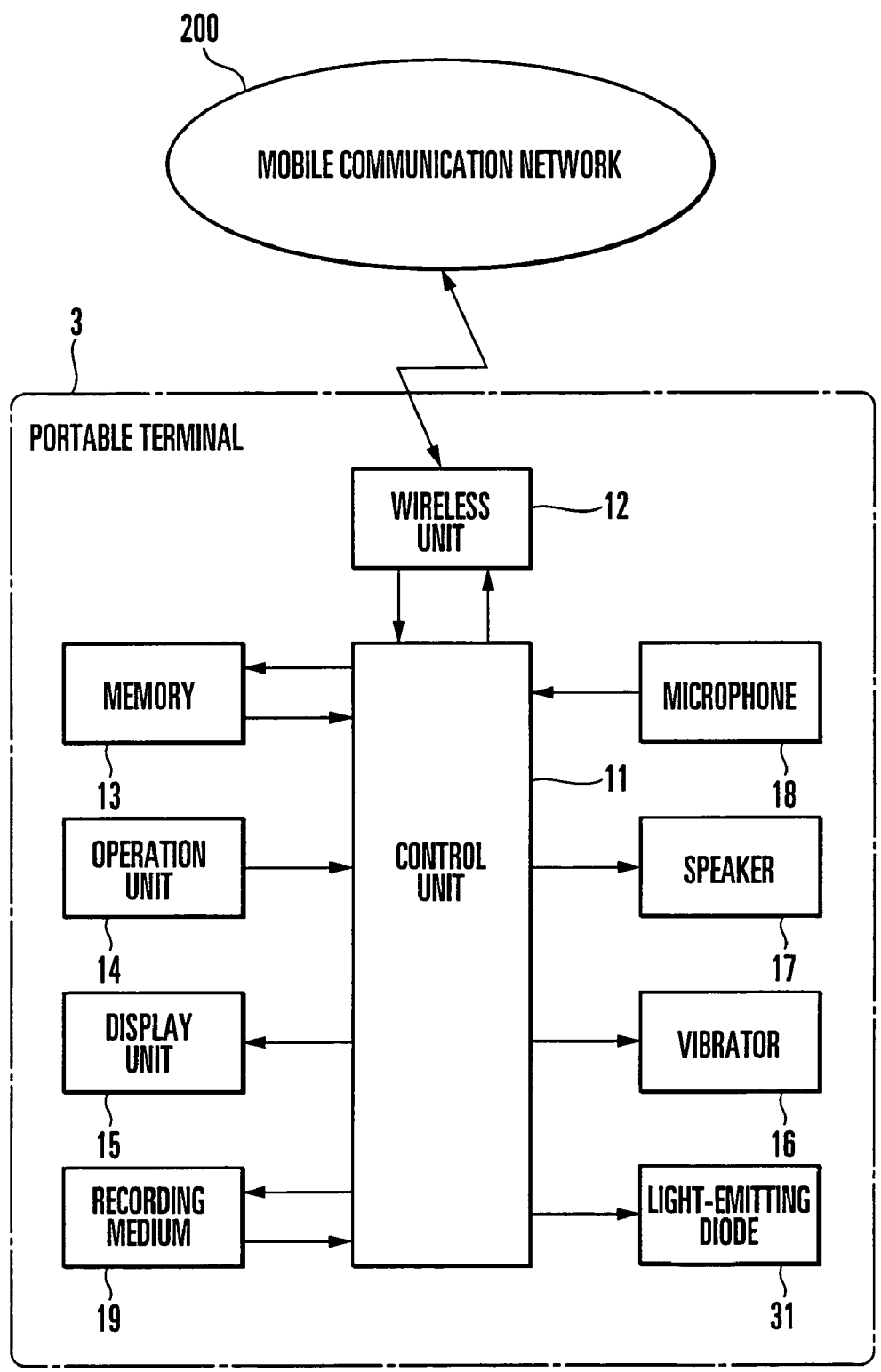
FIG. 17 is a block diagram showing the arrangement of a portable terminal according to the second embodiment of the present invention.

FIG. 17 shows the arrangement of a portable terminal according to the second embodiment of the present invention. A portable terminal 3 according to the second embodiment of the present invention shown in FIG. 17 has the same arrangement as that of the portable terminal 1 according to the first embodiment of the present invention shown in FIG. 4 except that a light-emitting diode (light-emitting unit) 31 is added. The same reference numerals as in FIG. 4 denote the same constituent elements in FIG. 17. The operations of the same constituent elements are almost the same as those in the first embodiment of the present invention.

When a reservation is registered, the light-emitting diode 31 serves as the first notification unit in place of the vibrator 16 to notify the user of the addition of the reservation by emitting light (blinking) in the portable terminal which is holding the talker right. In addition, the light-emitting diode 31 serves as the second notification unit to perform reservation priority notification by emitting light (blinking), instead of generating notification sound, in the portable terminal which has preferentially acquired the talker right by a reservation.

Note that in this embodiment, the addition of a reservation can be notified or reservation priority notification can be performed by combining the vibration of the vibrator 16, the generation of notification sound, the emission of light (blinking) of the light-emitting diode 31 or changing the notification contents. Alternatively, a display unit 15 functioning as a text display unit or an image display unit can be used as the first or second notification unit to notify the addition of a reservation or perform reservation priority notification using a text or an image. In addition, in this embodiment, during the wait of a reservation, the vibrator 16 may be made to generate vibrations or notification sound or the light-emitting diode 31 may be made to emit light (blink) at predetermined time intervals to urge the user to release the talker right.

Third Embodiment

Figure 18:
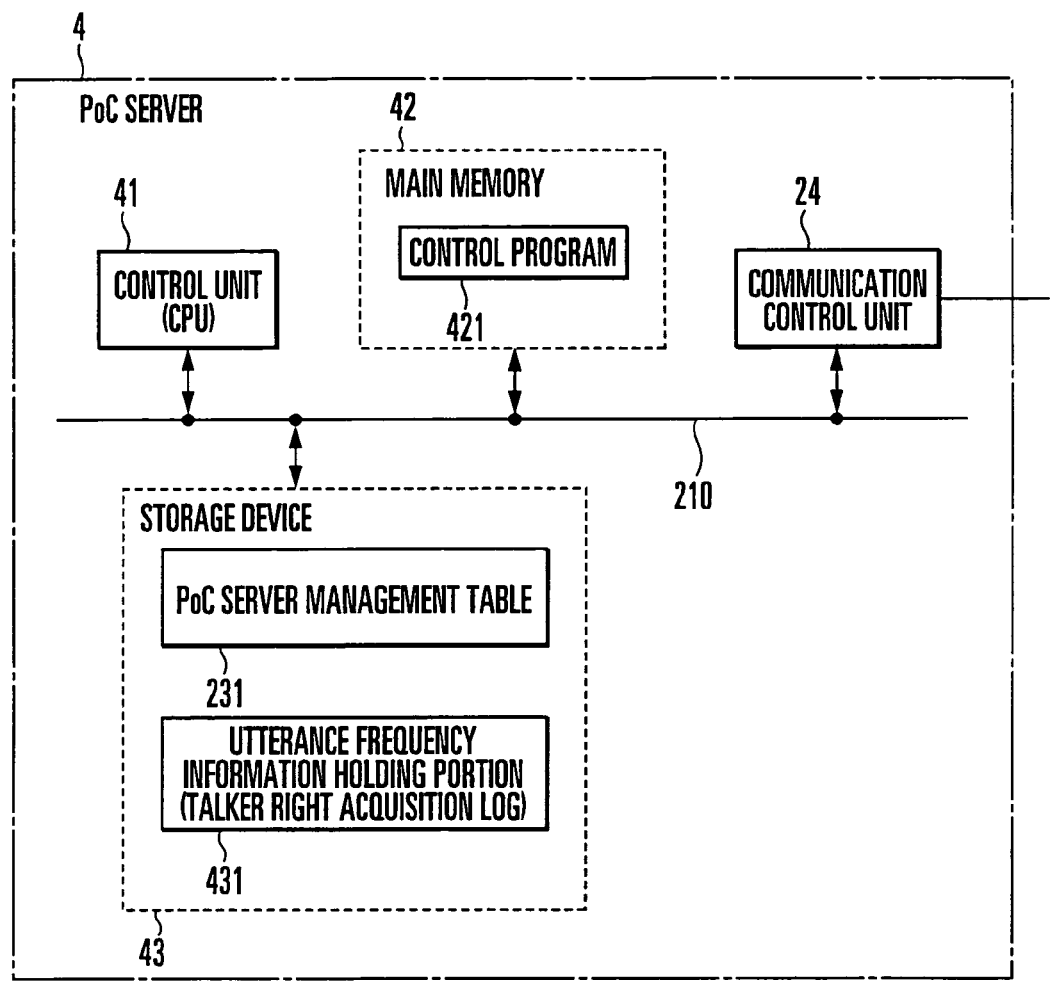
FIG. 18 is a block diagram showing the arrangement of a PoC server according to the third embodiment of the present invention.

FIG. 18 shows the arrangement of a PoC server according to the third embodiment of the present invention. Referring to FIG. 18, a PoC server 4 according to the third embodiment of the present invention includes a control unit 41, main memory 42, and storage device 43 in place of the control unit 21, main memory 22, and storage device 23. The main memory 42 stores a control program 421 executed by the control unit 41.

The storage device 43 stores an utterance frequency information holding portion 431 in addition to a PoC server management table 231.

Figure 19:
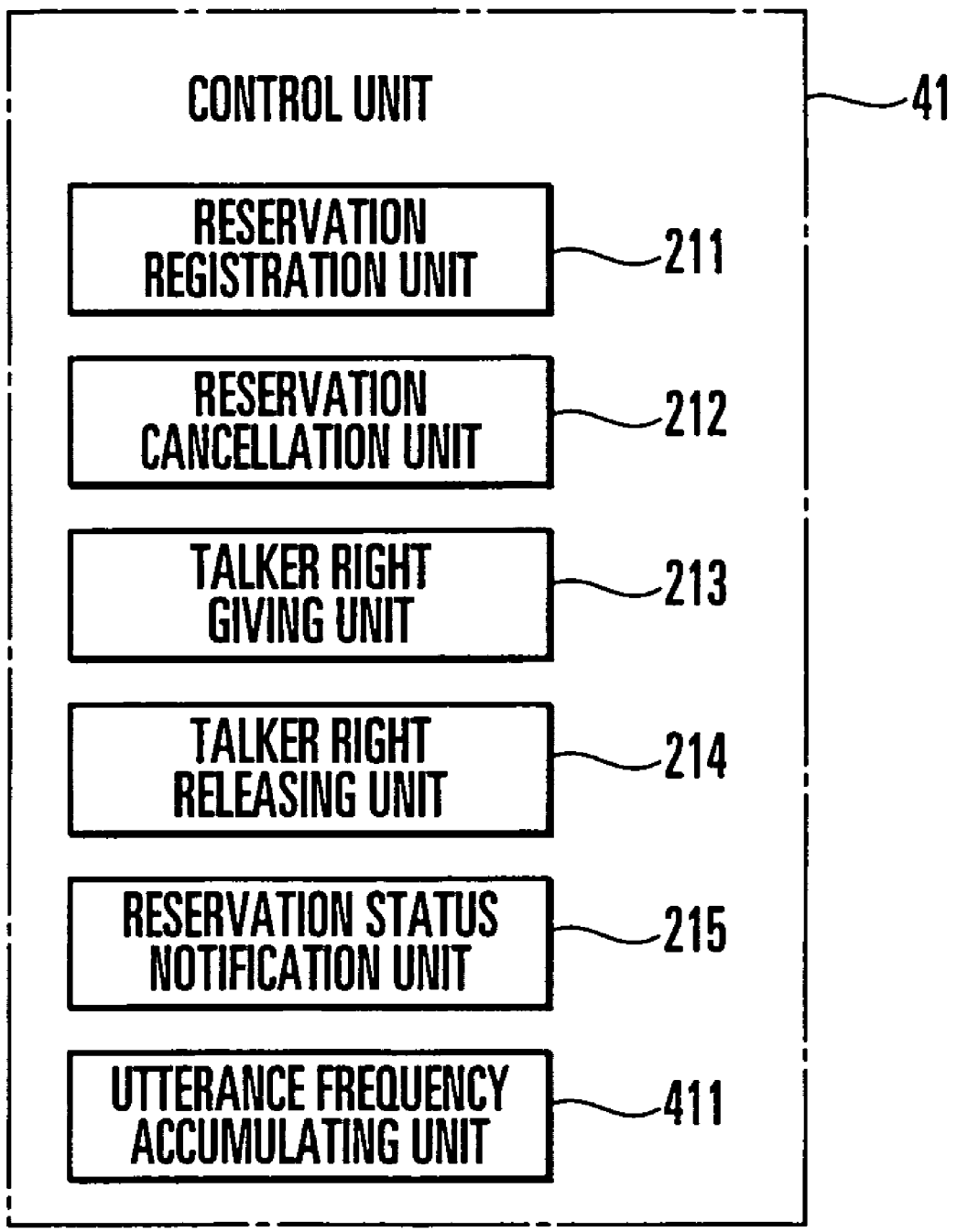
FIG. 19 is a functional block diagram of the control unit of the PoC server in FIG. 18.

FIG. 19 shows the control unit of the PoC server. The control unit 41 of the PoC server 4 executes the control program 421 in the main memory 42 to implement a reservation registration unit 211, reservation cancellation unit 212, talker right giving unit 213, talker right releasing unit 214, and reservation status notification unit 215 which are shown in FIG. 19. The same reference numerals as in FIGS. 6 and 16 denote the same constituent elements in FIGS. 18 and 19.

Every time one of portable terminals 1-1 to 1-n acquires the talker right, the utterance frequency accumulating unit (acquisition frequency accumulating unit) 411 of the control unit 21 of the PoC server 4 increments the count value [utterance count (talker right acquisition count)] in a storage area of the control program 421 which corresponds to the corresponding one of portable terminals 1-1 to 1-n. If there are a plurality of reservations when the portable terminal which is holding the talker right releases it, the talker right giving unit 213 preferentially assigns the talker right to one of the terminals on the basis of the count value.

If, for example, the talker right is to be preferentially assigned to a user whose utterance count is small, control is performed to preferentially assign the talker right to a user whose count value described above is small. Note however that a user who serves as a chairman or the like in speech communication among PoC members can be exempted from the above priority control.

In this embodiment, priority control is performed for the talker right on the basis of the utterance count (talker right acquisition count). However, an utterance time may be counted for each of the portable terminals 1-1 to 1-n, and priority control may be performed for the talker right on the utterance time. In addition, in this embodiment, the control unit 21 can force a portable terminal which is holding the talker right to release the talker right by transmitting a transmission end notification to the portable terminal, when the number of talker right reservations in the PoC server management table 231 becomes equal to or more than a predetermined number.

Fourth Embodiment

Figure 20:
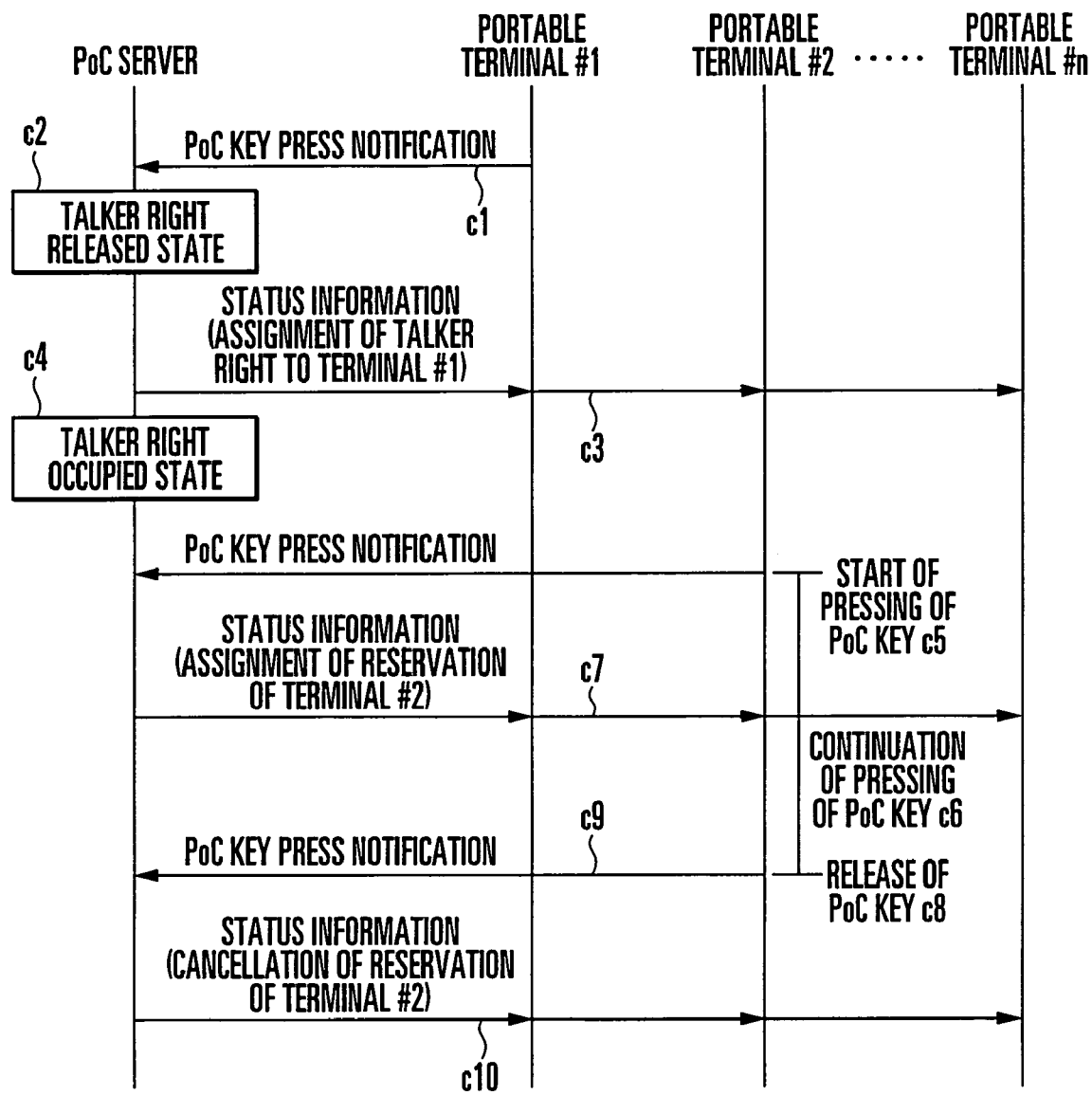
FIG. 20 is a sequence chart showing the operation of a speech communication system according to the fourth embodiment of the present invention.

FIG. 20 shows the operation of a speech communication system according to the fourth embodiment of the present invention. The operation of the speech communication system according to the fourth embodiment of the present invention will be described with reference to FIG. 20. The fourth embodiment of the present invention differs from the first embodiment of the present invention in that a reservation for the talker right can be registered by pressing the PoC key for a long period of time.

Assume that the PoC server receives a PoC key press notification from portable terminal #1 (c1 in FIG. 20), and the talker right is in the released state (c2 in FIG. 20). In this case, the PoC server transmits status information indicating that the talker right is assigned to portable terminal #1 to each of portable terminals #1 to #n (c3 in FIG. 20). The PoC server then gives the talker right to portable terminal #1 to set a talker right occupied state (c4 in FIG. 20).

When the PoC key of portable terminal #2 is kept pressed in this state (c5 and c6 in FIG. 20), a PoC key press notification (registration request notification) is transmitted from portable terminal #2 (registration request notification unit 111) to the PoC server. The PoC server registers a reservation for the talker right with respect to portable terminal #2, and transmits status information indicating the corresponding information (addition of a reservation) to each of portable terminals #1 to #n (c7 in FIG. 20). If the PoC key of portable terminal #2 is released before the status information indicating the assignment of the talker right is sent from the PoC server, a PoC key release notification (cancel request notification) is transmitted from portable terminal #2 (cancel request notification unit 112) to the PoC server, thereby canceling the registration of the reservation for the talker right (c8 to c10 in FIG. 20).

Fifth Embodiment

Figure 21:
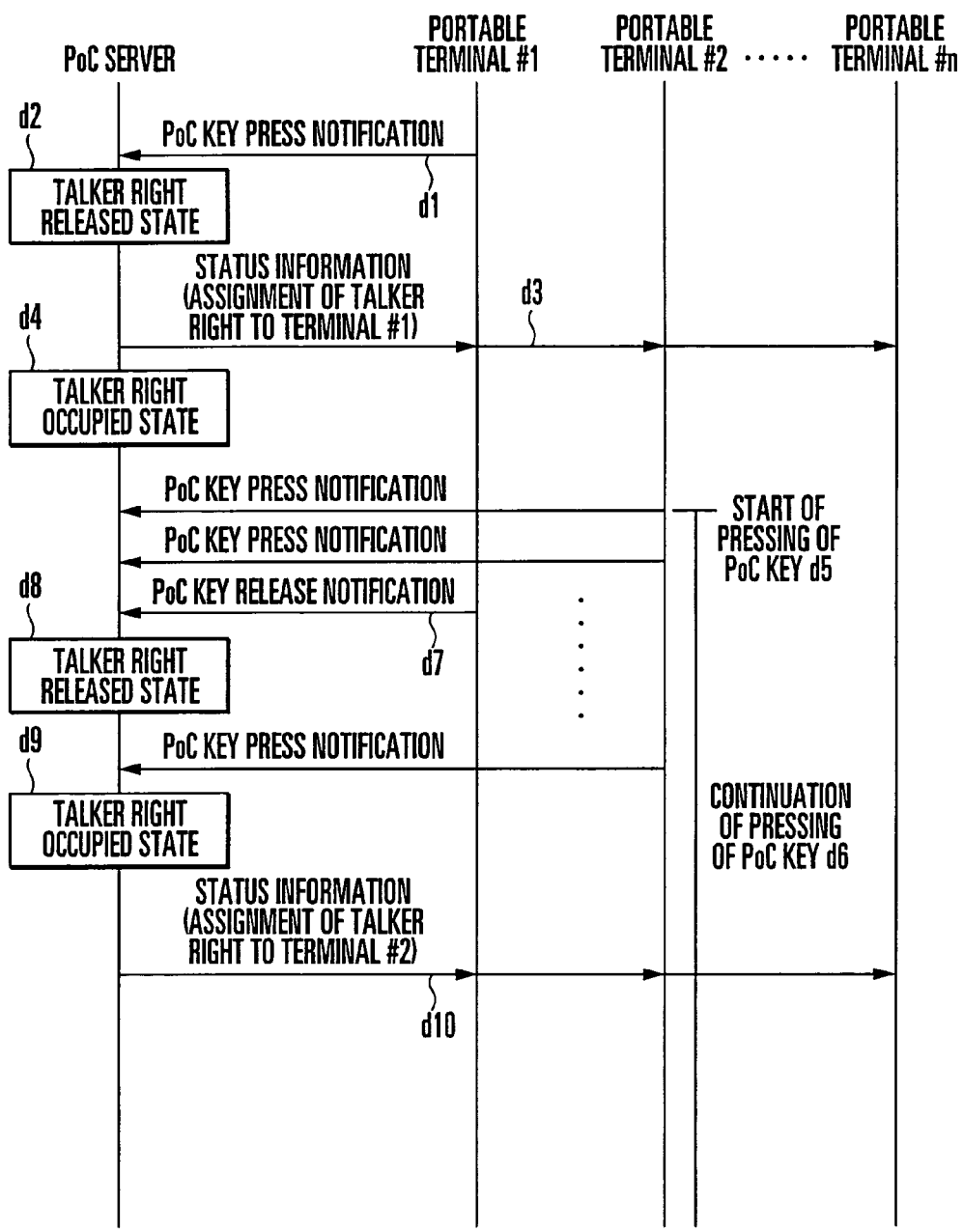
FIG. 21 is a sequence chart showing talker right reservation processing in a speech communication system according to the fifth embodiment of the present invention.

FIG. 21 shows talker right reservation processing in a speech communication system according to the fifth embodiment of the present invention. The fifth embodiment of the present invention is directed to allow a PoC server without a talker right reservation registration and cancellation function to easily acquire the talker right.

Assume that the PoC server receives a PoC key press notification from portable terminal #1 (d1 in FIG. 21), and the talker right is in the released state (d2 in FIG. 21). In this case, the PoC server transmits status information indicating that the talker right is assigned to portable terminal #1 to each of portable terminals #1 to #n (d3 in FIG. 21). The PoC server then gives the talker right to portable terminal #1 to set the talker right occupied state (d4 in FIG. 21).

If the PoC key of portable terminal #2 is kept pressed in this state (d5 and d6 in FIG. 21) and the PoC key of portable terminal #1 is released to set the talker right in the released state (d7 and d8 in FIG. 21), the PoC server transmits status information indicating that the talker right is assigned to portable terminal #2 to each of portable terminals #1 to #n (d9 and d10 in FIG. 21).

In this case, if the PoC key of portable terminal #2 is released before status information indicating that the talker right is assigned is transmitted from the PoC server, the talker right acquiring operation is terminated. Even in a case wherein status information indicating that the talker right is assigned is transmitted from the PoC server, if the PoC key of portable terminal #2 is released, the talker right is set in the released state.

In each embodiment of the present invention, the pressing of the PoC key is used as a trigger. However, making the user speak a predetermined sentence at the timing when the PoC key is pressed can replace the pressing of the PoC key. However, each of portable terminals #1 to #n requires a means for analyzing the above sentence. In addition, making the user input speech with a predetermined sound volume or more at the timing when the PoC key is pressed can replace the pressing of the PoC key.

What is claimed is:

1. A speech communication system characterized by comprising:

a plurality of portable terminals; and a server device which manages a talker right specifying a terminal which transmits speech when speech communication is performed between said portable terminals, said portable terminal comprising a registration request notification unit which transmits, to said server device in response to predetermined external operation, a registration request notification for requesting registration of a reservation for the talker right, said server device comprising a management table which stores management information containing a reservation status of the talker right, and a reservation registration unit which registers a reservation for the talker right in said management table in accordance with a registration request notification from said portable terminal, wherein said portable terminal further comprises a first notification unit which exteriorly notifies that a reservation has been registered, when the talker right is held by a self terminal, in response to a reservation addition notification indicating that the reservation for the talker right made by another terminal has been registered, wherein said portable terminal further comprises a second notification unit which exteriorly notifies acquisition of the talker right for a predetermined period of time when the talker right is acquired by the registration of the reservation for the talker right, wherein said portable terminal further comprises a talker right releasing unit which releases the acquired talker right when predetermined operation is not executed before notification by said second notification unit is complete, and wherein at least one of said first notification unit and said second notification unit comprises one of a vibration generating unit which vibrates the self terminal, a light-emitting unit which emits light, a sounding unit which generates preset notification sound, a text display unit which displays text information indicating a notification content, and an image display unit which displays image information indicating the notification content.

2. A system according to claim 1, further comprising a cancel request notification unit which transmits a cancel request notification for requesting cancellation of a reservation for the talker right, to said server device in response to another predetermined operation different from the predetermined operation in registration of the reservation for the talker right, wherein said server device further comprises a reservation cancellation unit which cancels a reservation for the talker right in said management table in accordance with a cancel request notification from said portable terminal.

3. A system according to claim 1, wherein said reservation registration unit registers a reservation if the talker right is given to another terminal when a registration request notification is received from said portable terminal.

4. A system according to claim 1, wherein said server device further comprises a talker right giving unit which gives the talker right to any of terminals whose reservations for the talker right have been registered in said management table when the talker right given to another terminal is released.

5. A system according to claim 1, wherein said server device further comprises a reservation status notification unit which notifies each of said portable terminals of a reservation status stored in said management table, and said portable terminal further comprises a display unit which displays the reservation status notified from said server device.

6. A system according to claim 4, wherein said talker right giving unit gives the talker right in the registration order of reservations in said management table.

7. A system according to claim 2, wherein the predetermined operation is pressing of a preset key.

8. A system according to claim 7, wherein said registration request notification unit transmits a registration request notification while the key is kept pressed, and said cancel request notification unit transmits a cancel request notification when the key is released.

9. A system according to claim 2, wherein the predetermined operation is at least one of inputting of an utterance of a preset sentence and inputting of sound with a sound volume not less than a predetermined sound volume.

10. A system according to claim 2, wherein
said registration request notification unit transmits a registration request notification when first predetermined operation is executed, and
said cancel request notification unit transmits a cancel request notification when second predetermined operation is executed after the first predetermined operation before acquisition of the talker right.

11. A system according to claim 4, further comprising an acquisition frequency accumulating unit which accumulates an acquisition frequency of the talker right,
wherein said talker right giving unit gives the talker right in accordance with an accumulation result obtained by said acquisition frequency accumulating unit when reservations for the talker right compete with each other.

12. A system according to claim 11, wherein said talker right giving unit gives the talker right to portable terminals in increasing order of acquisition frequencies.

13. A system according to claim 1, further comprising a talker right releasing unit which releases the talker right when the number of registered reservations for the talker right is not less than a predetermined number.

14. A system according to claim 2, wherein said reservation cancellation unit cancels a reservation for the talker right when a predetermined period of time elapses after the reservation for the talker right is registered in said management table, irrespective as to whether or not the reservation results in acquisition of the talker right.

15. A system according to claim 14, wherein said registration request notification unit re-transmits a registration request notification to said server device if the talker right cannot be acquired when a predetermined period of time elapses after the registration request notification is transmitted.

16. A system according to claim 1, wherein said registration request notification unit repeatedly transmits a registration request notification to said server device at predetermined time intervals.

17. A system according to claim 1, wherein said speech communication system is a PoC (Push-to-Talk over Cellular) system which manages the talker right in PoC by using said server device.

18. A portable terminal apparatus comprising:
a transmission control unit which transmits speech to another terminal when a talker right is given by a server device which manages the talker right specifying a terminal which transmits speech when speech communication is performed between portable terminals; and
a registration request notification unit which transmits, to the server device in response to predetermined external operation, a registration request notification for requesting registration of a reservation for the talker right;
a first notification unit which exteriorly notifies that a reservation for the talker right has been registered by another terminal, when a self terminal is holding the talker right, in response to a reservation addition notification indicating that the reservation has been registered;
a second notification unit which exteriorly notifies acquisition of the talker right for a predetermined period of time when the talker right is acquired by registration of a reservation for the talker right; and
a talker right releasing unit which releases the acquired talker right when predetermined operation is not executed before notification by said second notification unit is complete,
wherein at least one of said first notification unit and said second notification unit comprises one of a vibration generating unit which vibrates the self terminal, a light-emitting unit which emits light, a sounding unit which generates preset notification sound, a text display unit which displays text information indicating a notification content, and an image display unit which displays image information indicating the notification content.

19. An apparatus according to claim 18, further comprising a cancel request notification unit which transmits a cancel request notification for requesting cancellation of a reservation for the talker right, to the server device in response to another predetermined operation different from the predetermined operation in registration of the reservation for the talker right.

20. An apparatus according to claim 18, further comprising a display unit which displays a reservation status notified from the server device.

21. An apparatus according to claim 19, wherein the predetermined operation is pressing of a preset key.

22. An apparatus according to claim 21, wherein
said registration request notification unit transmits a registration request notification while the key is kept pressed, and
said cancel request notification unit transmits a cancel request notification when the key is released.

23. An apparatus according to claim 19, wherein the predetermined operation is at least one of inputting of an utterance of a preset sentence and inputting of sound with a sound volume not less than a predetermined sound volume.

24. An apparatus according to claim 19, wherein
said registration request notification unit transmits a registration request notification when first predetermined operation is executed, and
said cancel request notification unit transmits a cancel request notification when second predetermined operation is executed after the first predetermined operation before acquisition of the talker right.

25. An apparatus according to claim 18, wherein said registration request notification unit re-transmits a registration request notification to said server device if the talker right cannot be acquired when a predetermined period of time elapses after the registration request notification is transmitted.

26. An apparatus according to claim 18, wherein said registration request notification unit repeatedly transmits a registration request notification to said server device at predetermined time intervals.

27. An apparatus according to claim 18, wherein the talker right is a talker right in PoC (Push-to-Talk over Cellular).

28. A talker right reservation method comprising:
the step of causing a portable terminal to transmit a registration request notification for requesting registration of a reservation for a talker right, to the server device which manages the talker right specifying a terminal which transmits speech when speech communication is performed between a plurality of portable terminals in response to predetermined external operation; the step of causing the server device to register a reservation for the talker right in a management table which stores management information containing a reservation status of the talker right, in accordance with a registration request notification from the portable terminal;

the step of causing the portable terminal to exteriorly notify, by using a first notification unit, that a reservation has been registered, when the talker right is held by a self terminal, in response to a reservation addition notification indicating that the reservation for the talker right made by another terminal has been registered;

the step of causing the portable terminal to exteriorly notify acquisition of the talker right for a predetermined period of time by using a second notification unit when the talker right is acquired by the registration of the reservation for the talker right; and the step of releasing the acquired talker right when predetermined operation is not executed before notification by the second notification unit is complete, wherein at least one of the first notification unit and the second notification unit comprises one of a vibration generating unit which vibrates the self terminal, a light-emitting unit which emits light, a sounding unit which generates preset notification sound, a text display unit which displays text information indicating a notification content, and an image display unit which displays image information indicating the notification content.

29. A method according to claim 28, further comprising:

the step of causing the portable terminal to transmit a cancel request notification for requesting cancellation of a reservation for the talker right, to the server device in response to another predetermined operation different from the predetermined operation in registration of the reservation for the talker right; and the step of causing the server device to cancel a reservation for the talker right in the management table in accordance with a cancel request notification from the portable terminal.

30. A method according to claim 28, wherein in the step of registering, a reservation is registered if the talker right is given to another terminal when a registration request notification is received from the portable terminal.

31. A method according to claim 28, further comprising the step of giving the talker right to any of terminals whose reservations for the talker right have been registered in the management table when the talker right given to another terminal is released.

32. A method according to claim 28, further comprising:

the step of causing the server device to notify each of the portable terminals of a reservation status stored in the management table; and the step of causing the portable terminal to display the reservation status notified from the server device.

33. A method according to claim 31, wherein in the step of giving, the talker right is given in the registration order of reservations in the management table.

34. A method according to claim 29, wherein the predetermined operation is pressing of a preset key.

35. A method according to claim 34, wherein in the step of transmitting the registration request notification, the registration request notification is transmitted while the key is kept pressed, and in the step of transmitting the cancel request notification, the cancel request notification is transmitted when the key is released.

36. A method according to claim 29, wherein the predetermined operation is at least one of inputting of an utterance of a preset sentence and inputting of sound with a sound volume not less than a predetermined sound volume.

37. A method according to claim 29, wherein in the step of transmitting the registration request notification, the registration request notification is transmitted when first predetermined operation is executed, and in the step of transmitting the cancel request notification, the cancel request notification is transmitted when second predetermined operation is executed after the first predetermined operation before acquisition of the talker right.

38. A method according to claim 31, further comprising the step of accumulating an acquisition frequency of the talker right, wherein in the step of giving the talker right, the talker right is given in accordance with an accumulation frequency of the talker right when reservations for the talker right compete with each other.

39. A method according to claim 38, wherein in the step of giving, the talker right is given to portable terminals in increasing order of acquisition frequencies.

40. A method according to claim 28, further comprising the step of causing the server device to release the talker right when the number of registered reservations for the talker right is not less than a predetermined number.

41. A method according to claim 29, wherein in the step of canceling the reservation, the reservation for the talker right is canceled when a predetermined period of time elapses after the reservation for the talker right is registered in the management table, irrespective as to whether or not the reservation results in acquisition of the talker right.

42. A method according to claim 41, further comprising the step of causing the portable terminal to re-transmit a registration request notification to the server device if the talker right cannot be acquired when a predetermined period of time elapses after the registration request notification is transmitted.

43. A method according to claim 28, wherein in the step of transmitting the registration request notification, the registration request notification is repeatedly transmitted to the server device at predetermined time intervals.

44. A method according to claim 28, wherein the talker right is a talker right in PoC (Push-to-Talk over Cellular).

45. A recording medium which records a program for causing a computer to execute:

the step of giving one of portable terminals a talker right for specifying a terminal which transmits speech when speech communication is performed between the portable terminals;

the step of registering a reservation for the talker right in a management table storing management information containing a reservation status of the talker right in accordance with a notification transmitted from a portable terminal to which the talker right is not given;

the step of causing the portable terminal to exteriorly notify, by using a first notification unit, that a reservation has been registered, when the talker right is held by a self terminal, in response to a reservation addition notification indicating that the reservation for the talker right made by another terminal has been registered;

the step of causing the portable terminal to exteriorly notify acquisition of the talker right for a predetermined period of time by using a second notification unit when the talker right is acquired by the registration of the reservation for the talker right; and the step of releasing the acquired talker right when predetermined operation is not executed before notification by the second notification unit is complete, wherein at least one of the first notification unit and the second notification unit comprises one of a vibration generating unit which vibrates the self terminal, a light-emitting unit which emits light, a sounding unit which generates preset notification sound, a text display unit which displays text information indicating a notification content, and an image display unit which displays image information indicating the notification content.

46. A recording medium according to claim 45, wherein the program further causes the computer to execute:

the step of causing the portable terminal to transmit a cancel request notification for requesting cancellation of a reservation for the talker right, to a server device in response to a predetermined operation performed in registration of the reservation for the talker right; and the step of causing the server device to cancel a reservation for the talker right in the management table in accordance with a cancel request notification from the portable terminal.

47. A recording medium according to claim 46, wherein in the step of canceling the reservation, the reservation for the talker right is canceled when a predetermined period of time elapses after the reservation for the talker right is registered in the management table, irrespective as to whether or not the reservation results in acquisition of the talker right.

* * * * *